United States Patent
Tsujimoto

(10) Patent No.: US 12,516,176 B2
(45) Date of Patent: Jan. 6, 2026

(54) ULTRAHIGH-MOLECULAR-WEIGHT POLYETHYLENE POWDER AND MOLDED ARTICLE

(71) Applicant: Asahi Kasei Kabushiki Kaisha, Tokyo (JP)

(72) Inventor: Koichi Tsujimoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 486 days.

(21) Appl. No.: 18/129,428

(22) Filed: Mar. 31, 2023

(65) Prior Publication Data

US 2023/0323081 A1    Oct. 12, 2023

(30) Foreign Application Priority Data

Apr. 6, 2022 (JP) ................. 2022-063450

(51) Int. Cl.
*C08K 5/13* (2006.01)
*C08F 110/02* (2006.01)

(52) U.S. Cl.
CPC .............. *C08K 5/13* (2013.01); *C08F 110/02* (2013.01)

(58) Field of Classification Search
None
See application file for complete search history.

(56) References Cited

U.S. PATENT DOCUMENTS

| | | |
|---|---|---|
| 5,231,119 A | 7/1993 | Govoni et al. |
| 8,173,755 B2 * | 5/2012 | Fujiwara ................. C08F 10/00 526/155 |
| 2008/0090081 A1 | 4/2008 | Matsumoto et al. |
| 2009/0098381 A1 | 4/2009 | Nakayama et al. |
| 2012/0202044 A1 | 8/2012 | Brant et al. |
| 2017/0125763 A1 | 5/2017 | Inatomi et al. |
| 2017/0321047 A1 | 11/2017 | Vantomme et al. |
| 2021/0017363 A1 | 1/2021 | Tsujimoto |
| 2024/0002557 A1 | 1/2024 | Tsujimoto |

FOREIGN PATENT DOCUMENTS

| | | |
|---|---|---|
| CN | 101490110 A | 7/2009 |
| CN | 111868113 A | 10/2020 |
| CN | 113004446 A | 6/2021 |
| JP | S63-033403 A | 2/1988 |
| JP | H05-194620 A | 8/1993 |
| JP | 2003-026851 A | 1/2003 |
| JP | 2007-161896 A | 6/2007 |
| JP | 2015-120784 A | 7/2015 |
| JP | 2015-193816 A | 11/2015 |
| JP | 2017-088773 A | 5/2017 |
| JP | 2017-145306 A | 8/2017 |
| JP | 2018-141136 A | 9/2018 |
| JP | 2019-019265 A | 2/2019 |
| JP | 2019-070117 A | 5/2019 |
| JP | 2019-123777 A | 7/2019 |
| WO | 2006/109747 A1 | 10/2006 |
| WO | 2021/193544 A1 | 9/2021 |

* cited by examiner

*Primary Examiner* — Fred M Teskin
(74) *Attorney, Agent, or Firm* — Morgan, Lewis & Bockius LLP

(57) ABSTRACT

An object of the present invention is to provide an ultrahigh-molecular-weight polyethylene powder that is excellent in molding processability by having a void in a central part of the powder, and a high-quality molded article (e.g., separator for secondary battery and fiber) prepared by molding the same. The ultrahigh-molecular-weight polyethylene powder has intrinsic viscosity IV of 1.0 dL/g or more and 33.0 dL/g or less, wherein a proportion of a predetermined void inside the powder determined by a specific method is 5% or more.

9 Claims, No Drawings

ULTRAHIGH-MOLECULAR-WEIGHT POLYETHYLENE POWDER AND MOLDED ARTICLE

BACKGROUND OF THE INVENTION

Field of the Invention

The present invention relates to an ultrahigh-molecular-weight polyethylene powder and a molded article.

Description of the Related Art

Polyethylene is employed in a wide variety of uses such as films, sheets, microporous membranes, fibers, foams, and pipes. Polyethylene is used because melt processing is easy and the obtained molded article has high mechanical strength and is also excellent in chemical resistance, rigidity, etc. Among others, ultrahigh-molecular-weight polyethylene has higher mechanical strength because of its large molecular weight and is excellent in slidability and abrasion resistance and also excellent in chemical stability and long-term reliability.

However, the ultrahigh-molecular-weight polyethylene has low fluidity even if melted at a temperature equal to or higher than a melting point. Therefore, for example, a compression molding method of compression-molding a polyethylene powder under heating, followed by cutting, or a molding method of dissolving a polyethylene powder in a solvent such as liquid paraffin, then performing drawing, and removing the solvent for molding into a sheet or a thread form, is applied thereto.

The ultrahigh-molecular-weight polyethylene is molded in a powder state. The powder has a larger surface area than that of a pellet and has fine pores in the powder.

As for the pore state of the polyethylene powder, for example, Japanese Patent Laid-Open No. 2017-088773 discloses a polyethylene powder that is rapidly dissolved in a solvent and is used to produce a molded article with less occurrence of undissolved matter, by adjusting a specific surface area determined by a BET method and a pore volume determined by a mercury intrusion method to proper ranges.

For example, Japanese Patent Laid-Open No. 2017-145306 discloses a polyethylene powder that is used to produce a molded article with less occurrence of undissolved matter, by adjusting the ratio between the median diameter and the modal diameter of pores measured by a mercury intrusion method to a proper range.

In recent years, a polyethylene powder has been proposed which is excellent in molding processability and used to produce a high-quality molded article.

For example, Japanese Patent Laid-Open No. 2019-019265 discloses a polyethylene powder that has excellent solubility and is capable of improving productivity and product quality in processing molding (particularly, wet extrusion molding), by imparting a predetermined particle size distribution and a predetermined swelling ratio to the polyethylene powder.

For example, Japanese Patent Laid-Open No. 2019-070117 discloses a polyethylene polymer powder improved in oxidation resistance while effectively improved in membrane uniformity and smoothness of a thin film, by controlling intrinsic viscosity IV and the contents of Al, Mg and Si in specific ranges.

For example, Japanese Patent Laid-Open No. 2019-123777 discloses an ethylene polymer that is less entangled when processed and drawn, is excellent in low-temperature tensile strength in the form of a high-strength fiber, and is excellent in rate of shrinkage of a membrane and low-temperature puncture strength in the form of a microporous membrane, by allowing the ethylene polymer to contain nonmagnetic matter that satisfies specific conditions.

As mentioned above, the ultrahigh-molecular-weight polyethylene powder has a larger surface area than that of a pellet and has fine pores in the powder. Hence, the shape, surface state, crystal state, pore state, and the like of the powder are changed during heating. Therefore, the molding of the ultrahigh-molecular-weight polyethylene powder requires adjustment to a proper temperature and processing such as dissolution or compression. In the case of compression-molding the ultrahigh-molecular-weight polyethylene powder, air bubbles tend to remain in the resulting molded article or strain tends to remain in the resulting molded article and to cause deformation after cooling, unless a preheating temperature before compression is proper.

The polyethylene powder described in Japanese Patent Laid-Open No. 2017-088773 merely undergoes the adjustment of a specific surface area and a pore volume as powder properties. The properties of the powder are largely changed at an actual dissolution or melting temperature, and this powder is still susceptible to improvement in molding processability.

The polyethylene powder described in Japanese Patent Laid-Open No. 2017-145306 also merely undergoes the definition of a powder pore size. Since the pore size is largely changed during the process of heating, the powder is still susceptible to improvement in molding processability and may have the difficulty in producing a homogeneous molded article.

Meanwhile, the polyethylene powders described in Japanese Patent Laid-Open Nos. 2019-019265, 2019-070117, and 2019-123777 are relatively excellent in molding processability and however, have not discussed about the obtainment of a homogeneous gel in a short time. Thus, the powders are still susceptible to improvement in molding processability and molded article quality.

The present invention has been made in light of the circumstances described above, and an object of the present invention is to provide an ultrahigh-molecular-weight polyethylene powder that can be used to produce a homogenous gel in a short time by drastically shortening a kneading time when the ultrahigh-molecular-weight polyethylene powder is used in the preparation of a molded article, and is also excellent in molding processability by preparing a gel having a high polymer concentration, and to provide a high-quality molded article (e.g., separator for secondary battery excellent in uneven film thickness and puncture strength, and fiber excellent in uneven thread diameter and high-speed windability) prepared by molding the same.

SUMMARY OF THE INVENTION

The present inventor has pursued diligent studies to attain the object and consequently completed the present invention by finding that the object can be attained by controlling a voidage (ratio of an area occupied by a void to a predetermined area of a powder) in an ultrahigh-molecular-weight polyethylene powder.

Specifically, the present invention is as follows:

[1]

An ultrahigh-molecular-weight polyethylene powder having intrinsic viscosity IV of 1.0 dL/g or more and 33.0 dL/g or less, and having a void inside the ultrahigh-molecular-weight polyethylene powder, wherein
a proportion of an area occupied by the void in a cross-sectional structure of the powder is 5% or more with respect to cross-sectional area A,
the cross-sectional structure is a structure of a cross section of powder P having a particle size belonging to a range of average particle size $D_{50} \pm 5$ µm in the powder, and
the cross-sectional area A is an area of 20 µm×20 µm square centered on a point of intersection between diagonals of a quadrangle which circumscribes the powder P.

[2]
The ultrahigh-molecular-weight polyethylene powder according to [1], wherein
a proportion of an ultrahigh-molecular-weight polyethylene powder having a particle size of 300 µm or larger is 10% by mass or less with respect to the total amount of the ultrahigh-molecular-weight polyethylene powder, and
a proportion of an ultrahigh-molecular-weight polyethylene powder having a particle size of smaller than 53 µm is 20% by mass or less with respect to the total amount of the ultrahigh-molecular-weight polyethylene powder.

[3]
The ultrahigh-molecular-weight polyethylene powder according to [1] or [2], wherein
a degree of crystallinity is 70% or more and 85% or less.

[4]
The ultrahigh-molecular-weight polyethylene powder according to any of [1] to [3], wherein
an apparent density is 0.45 g/cm³ or smaller.

[5]
The ultrahigh-molecular-weight polyethylene powder according to any of [1] to [4], wherein
a titanium content is 10 ppm or less.

[6]
The ultrahigh-molecular-weight polyethylene powder according to any of [1] to [5], wherein
a titanium content is 3 ppm or less.

[7]
A molded article
prepared by molding the ultrahigh-molecular-weight polyethylene powder according to any of [1] to [6].

[8]
The molded article according to [7], wherein
the molded article is a separator for secondary battery.

[9] The molded article according to [7], wherein
the molded article is a fiber.

According to the present invention, an ultrahigh-molecular-weight polyethylene powder is excellent in molding processability by having predetermined intrinsic viscosity IV and having a predetermined void inside the powder, and can be used to produce a high-quality molded article (e.g., separator for secondary battery and fiber).

DETAILED DESCRIPTION OF THE PREFERRED EMBODIMENTS

Hereinafter, a mode for carrying out the present invention (hereinafter, simply referred to as the "present embodiment") will be described in detail. However, the present invention is not intended to be limited by the present embodiment. Various changes or modifications can be made in the present invention without departing from the spirit thereof.

[Ultrahigh-Molecular-Weight Polyethylene Powder]
The ultrahigh-molecular-weight polyethylene powder (hereinafter, also simply referred to as the "powder" or the "polymer") of the present embodiment has intrinsic viscosity IV of 1.0 dL/g or more and 33.0 dL/g or less, preferably 1.5 dL/g or more and 31.0 dL/g or less, more preferably 2.4 dL/g or more and 29.0 dL/g or less.

The ultrahigh-molecular-weight polyethylene powder of the present embodiment has better strength when having the intrinsic viscosity IV equal to or more than the lower limit, and has better molding processability when having the intrinsic viscosity IV equal to or less than the upper limit.

The intrinsic viscosity IV of the ultrahigh-molecular-weight polyethylene powder of the present embodiment is not particularly limited and is preferably 1.0 dL/g or more and 13.0 dL/g or less, more preferably 1.5 dL/g or more and 11.5 dL/g or less, further preferably 2.4 dL/g or more and 9.5 dL/g or less, for example, for use in a molded article of a separator for secondary battery. A separator for secondary battery obtained by molding the ultrahigh-molecular-weight polyethylene powder having the intrinsic viscosity IV within the range described above tends to be excellent in membrane strength and thermal shrink properties, etc.

The intrinsic viscosity IV of the ultrahigh-molecular-weight polyethylene powder of the present embodiment is not particularly limited and is preferably 13.5 dL/g or more and 33.0 dL/g or less, more preferably 15.0 dL/g or more and 31.0 dL/g or less, further preferably 16.5 dL/g or more and 29.0 dL/g or less, for example, for use in a molded article of a fiber. A fiber obtained by molding (e.g., general molding or molding when the powder is swollen beforehand at a low temperature) the ultrahigh-molecular-weight polyethylene powder having the intrinsic viscosity IV within the range described above tends to be excellent in thread strength, etc.

The method for controlling the intrinsic viscosity IV to the range mentioned above is not particularly limited and involves, for example, changing the polymerization temperature of a reactor where ethylene is homopolymerized or where ethylene and an olefin, other than ethylene, copolymerizable therewith are copolymerized. The intrinsic viscosity IV tends to be lower as the polymerization temperature is higher, and tends to be higher as the polymerization temperature is lower. Another method for controlling the intrinsic viscosity IV to the range mentioned above is not particularly limited and involves, for example, changing the type of an organic metal compound for use as a promoter in the homopolymerization of ethylene or the copolymerization of ethylene and an olefin, other than ethylene, copolymerizable therewith. A further alternative method for controlling the intrinsic viscosity IV to the range mentioned above is not particularly limited and involves, for example, adding a chain transfer agent in the homopolymerization of ethylene or the copolymerization of ethylene and an olefin, other than ethylene, copolymerizable therewith. The addition of the chain transfer agent tends to decrease the intrinsic viscosity IV of the ultrahigh-molecular-weight polyethylene to be produced even at the same polymerization temperature.

In the present embodiment, the intrinsic viscosity IV can be determined by, for example, but not particularly limited to, a method described in Examples mentioned later.

The ultrahigh-molecular-weight polyethylene powder of the present embodiment is preferably a powder consisting of an ethylene homopolymer and/or a copolymer of ethylene and an olefin (hereinafter, also referred to as a comonomer), other than ethylene, copolymerizable therewith (hereinafter, the homopolymer and the copolymer are also collectively referred to as the "ethylene-based polymer").

Specific examples of the comonomer described above copolymerizable with ethylene include, but are not particularly limited to, at least one comonomer selected from the group consisting of α-olefins having 3 or more and 15 or less carbon atoms, cyclic olefins having 3 or more and 15 or less carbon atoms, compounds represented by the formula $CH_2=CHR^1$ (wherein $R^1$ is an aryl group having 6 to 12 carbon atoms), and linear, branched, or cyclic dienes having 3 or more and 15 or less carbon atoms. Among them, an α-olefin having 3 or more and 15 or less carbon atoms is preferred.

Examples of the α-olefin include, but are not particularly limited to, propylene, 1-butene, 4-methyl-1-pentene, 1-hexene, 1-octene, 1-nonene, 1-decene, 1-undecene, 1-dodecene, 1-tridecene, and 1-tetradecene.

The comonomer content measured by $^{13}$C-NMR in the ultrahigh-molecular-weight polyethylene powder of the present embodiment is preferably 1.0 mol % or less, more preferably 0.1 mol % or less, further preferably 0 mol %. The ultrahigh-molecular-weight polyethylene powder of the present embodiment having the comonomer content that falls within the range described above tends to be able to suppress decomposition and tends to improve the strength, etc. of a molded article obtained by molding the ultrahigh-molecular-weight polyethylene powder.

[Proportion of Void of Ultrahigh-Molecular-Weight Polyethylene Powder]

The ultrahigh-molecular-weight polyethylene powder of the present embodiment has a void inside a powder constituting the ultrahigh-molecular-weight polyethylene powder, and the proportion of an area occupied by the void in the cross-sectional structure of the powder is 5% or more, preferably 10% or more, more preferably 15% or more, most preferably 20% or more, with respect to cross-sectional area A mentioned later.

In this context, the cross-sectional structure is a structure of a cross section of powder P having a particle size belonging to a range of average particle size $D_{50}\pm5$ μm in the powder, and the cross-sectional area A means an area of 20 μm×20 μm square centered on a point of intersection between diagonals of a quadrangle which circumscribes the powder P.

The quadrangle which circumscribes the powder P according to the present embodiment means only a quadrangle in which the proportion of a polymer-occupied part which is a part occupied by a polymer, except for the void, in the cross section of the powder is 20% or more.

In the present embodiment, the void includes a polymer-sparse part which is a part having a sparse polymer identifiable with the void in the observation of a cross-sectional image of the powder under an optical microscope.

The average particle size $D_{50}$ of the powder is not particularly limited and can be calculated by, for example, the following method.

100 g of the ultrahigh-molecular-weight polyethylene powder of the present embodiment is classified using 10 types of sieves (aperture size: 710 μm, 500 μm, 425 μm, 355 μm, 300 μm, 212 μm, 150 μm, 106 μm, 75 μm, and 53 μm) stipulated by JIS Z 8801, and a particle size that reached 50% by weight in an integral curve in which the weights of particles remaining on respective sieves are integrated from the smaller aperture size can be regarded as average particle size ($D_{50}$).

The cross-sectional structure of the powder is not particularly limited and specifically, can be observed by, for example, the following method.

A fraction containing a powder having the average particle size $D_{50}$ is collected. The collected powder is embedded using high-performance adhesive Araldite Standard (NICHIBAN Co., Ltd.) and dried at 30° C. for 24 hours to prepare a resin-embedded sample. Epoxy resin serving as a base and modified polyamine serving as a curing agent are mixed at a ratio of 1:1. Subsequently, the resin-embedded sample is cut into a 10 μm thick section using a microtome manufactured by Nihon Microtome Laboratory, Inc., and the section of the sample thus obtained is placed on a glass slide, to which a small amount (0.05 mL) of liquid paraffine manufactured by MORESCO Corp. (product name: Smoil P-350P) is then added. A glass cover is placed thereon. Then, differential interference contrast observation can be performed under optical microscope BX51 manufactured by Olympus Corp. (the light intensity of the microscope is fixed to memory 9) to observe cross-sectional images of the powder.

The area occupied by the void with respect to the cross-sectional area A in the cross-sectional structure of the powder is not particularly limited and can be calculated by, for example, the following method.

Particles of $D_{50}\pm5$ μm are arbitrarily observed at, for example, but not particularly limited to, 10 points, and cross-sectional images of the powder are taken. Then, the cross-sectional images of the powder taken by microscopic observation are binarized (white: polymer-occupied part, black: void) using image analysis software (A-Zo Kun ver. 2.50 manufactured by Asahi Kasei Corp.). An arbitrary quadrangle circumscribing the polymer-occupied part (white) is drawn, and the point of intersection between the diagonals of the quadrangle is regarded as a central part of the powder (hereinafter, also referred to as a powder central part). In this context, the quadrangle which circumscribes the powder P according to the present embodiment is only a quadrangle in which the proportion of the polymer-occupied part (white) is 20% or more. Next, a 20 μm×20 μm square is drawn with the powder central part as an axis such that the square is parallel with the quadrangle. The proportions of the void (black) and the polymer-occupied part (white) in the square are determined. The same image analysis as above is conducted as to all the 10 points photographed by optical microscopic observation, and an average value thereof can be regarded as the proportion of the area of the void (black).

The ultrahigh-molecular-weight polyethylene powder of the present embodiment having the proportion of the void that falls within the range described above can reduce environmental load by reducing energy required for wet extrusion processing, for example, when processed by wet extrusion into a fiber (e.g., high-strength fiber) or a separator for secondary battery (e.g., microporous membrane), and can also drastically improve the production efficiency of the molded article. In general, the wet extrusion processing refers to a process of kneading slurry of a powder impregnated with liquid paraffin under heat in an extruder, and processing the resulting gel form into each molded article. In this context, the processability of a molded article is influenced by the amount of a molecular chain entangled in the gel. Ultrahigh-molecular-weight polyethylene powders have very strong entanglement of a molecular chain in an amorphous moiety, and a disentangled homogeneous gel is difficult to obtain therefrom. However, since the ultrahigh-molecular-weight polyethylene powder of the present embodiment has the void in the powder central part, the amount of a molecular chain entangled per 1 g of the powder is probably smaller than that of a usual powder having no void. Furthermore, a given amount or more of liquid paraffin can be accumulated in the void when the central part is impregnated with the liquid paraffin from the powder surface through pores in the powder. In short, the amorphous moiety is impregnated with liquid paraffin from both the powder surface and the central part so that the molecular chain can be disentangled. Therefore, the ultrahigh-molecular-weight polyethylene powder of the present embodiment is excellent in molding processability and can be used to produce a homogenous gel in a short time, as compared with a usual powder having no void. As a result, a high-quality molded article, for example, a separator for secondary battery having high breaking strength with thickness variations suppressed, or a fiber that is drawable at a high speed with an uneven thread diameter suppressed, can be obtained in wet extrusion processing.

Examples of the method for controlling the proportion of the void in the ultrahigh-molecular-weight polyethylene powder to the range mentioned above include, but are not particularly limited to, a method of performing preliminary polymerization, and performing polymerization with the resulting polymer as a preliminary polymerization catalyst under a high-pressure condition (hereinafter, also referred to as control method 1), a method of performing polymerization using a deposited catalyst that is a fine powder with a catalytic particle size and has few variations in particle size, followed by drying with high-speed rotation at a high temperature (hereinafter, also referred to as control method 2), and a method of collecting only a fine powder polymer by classification, and drying again the powder with high-speed rotation at a high temperature (also referred to as control method 3).

Although the mechanism under which the proportion of the sparse part or the void in the ultrahigh-molecular-weight polyethylene powder can be controlled to the range mentioned above by the methods mentioned above is not clear and is not limited to a mechanism given below, the present inventor has made the following presumption.

Although the reason is not certain and is not limited by the following description, the control method 1 described above can perform polymerization in a highly active state of initial polymerization activity by polymerization under a high-pressure condition using a preliminary polymerization catalyst. Hence, a large amount of polymerization heat energy is generated in the polymerization step, and a void is probably formed in the powder central part while the heat energy is escaped from the powder central part to the outside.

Although the reason is not certain and is not limited by the following description, the control method 2 described above produces primary polymer particles that have a small particle size and a uniform particle size by polymerization using a deposited catalyst that is a fine powder with a catalytic particle size and has few variations in particle size. The primary polymer particles are dried with high-speed rotation at a high temperature so that the number of contact between the primary polymer particles is controlled and contacted locations are partially fused to form a powder with the primary polymer particles aggregated. The powder has a structure having a void between the aggregated primary polymer particles. Thus, a structure having a void in the powder central part is probably formed.

Although the reason is not certain and is not limited by the following description, the control method 3 described above involves classifying a powder polymerized using the deposited catalyst to collect only fine powder components. The fine powder components are dried with high-speed rotation at a high temperature so that the number of contact between the particles of the fine powder is controlled and contacted locations are partially fused to form a powder with the fine powder particles aggregated. The powder has a structure having a void between the aggregated fine powder particles. Thus, a structure having a void in the powder central part is probably formed.

[Proportions of Fine Powder Component and Coarse Powder Component in Ultrahigh-Molecular-Weight Polyethylene Powder]

In the ultrahigh-molecular-weight polyethylene powder of the present embodiment, the proportion of a ultrahigh-molecular-weight polyethylene powder having a particle size of 300 μm or larger is 10% by mass or less, preferably 8% by mass or less, more preferably 6% by mass or less, most preferably 4% by mass or less, with respect to the total amount of the ultrahigh-molecular-weight polyethylene powder. The proportion of a ultrahigh-molecular-weight polyethylene powder having a particle size of smaller than 53 μm is 20% by mass or less, preferably 15% by mass or less, more preferably 10% by mass or less, most preferably 6% by mass or less, with respect to the total amount of the ultrahigh-molecular-weight polyethylene powder.

The wet extrusion processing of the ultrahigh-molecular-weight polyethylene powder involves the step of impregnating the ultrahigh-molecular-weight polyethylene powder with liquid paraffin as preliminary preparation. This step is performed with stirring at a temperature equal to or lower than the melting point of the ultrahigh-molecular-weight polyethylene powder. Therefore, the liquid paraffin enters the amorphous moiety through pores in the powder, and the powder swells up during the process of disentanglement of the molecular chain. In this respect, the time to complete swelling (swelling time; time required for the powder to reach the maximum equivalent circle diameter by the impregnation of the powder with liquid paraffin) differs depending on the particle size of the powder and is longer for particles having a larger particle size (hereinafter, also referred to as coarse powder components) and shorter for particles having a smaller particle size (hereinafter, also referred to as fine powder components). In short, a homogeneous gel having a disentangled molecular chain cannot be obtained unless a sufficient time is secured as the swelling time according to the coarse powder components. If the swelling time is shortened according to the fine powder components, the coarse powder components are charged in an insufficiently swollen state into an extruder. Therefore, the fine powder components start to be melted first and are fused to the surface of the coarse powder components, thereby further inhibiting the swelling of the coarse powder components. Hence, a homogeneous gel cannot be obtained because the whole powder is melted without sufficiently disentangling the molecular chain of the coarse powder components. However, a longer swelling time according to the coarse powder components deteriorates production efficiency. Accordingly, it is important to reduce the difference in time to complete swelling between the particles of the powder by controlling the proportions of the fine powder components and the coarse powder components in the ranges mentioned above. As a result, a higher-quality molded article can be obtained in wet extrusion processing. In the present embodiment, the particle size distribution can be determined by, for example, but not particularly limited to, a method described in Examples mentioned later.

The method for controlling the particle size of the ultra-high-molecular-weight polyethylene powder of the present embodiment to the range mentioned above is not particularly limited, and the particle size can be controlled, for example, by adjusting the particle size and/or amount of a catalyst for use in polymerization. The particle size of the ultrahigh-molecular-weight polyethylene powder to be produced is controlled by adjusting the particle size of the catalyst. Further, the particle size-based content of the ultrahigh-molecular-weight polyethylene powder to be produced can also be controlled by polymerization using a mixed catalyst of catalysts having various particle sizes.

[Degree of Crystallinity of Ultrahigh-Molecular-Weight Polyethylene Powder]

The degree of crystallinity of the ultrahigh-molecular-weight polyethylene powder of the present embodiment is 70% or more and 85% or less, preferably 70% or more and 83% or less, more preferably 72% or more and 83% or less, most preferably 74% or more and 83% or less. The ultra-high-molecular-weight polyethylene powder of the present embodiment having the degree of crystallinity of 70% or more can be used to produce a high-strength molded article. This is presumably because a homogenous gel having a disentangled molecular chain is easily obtained because of a small proportion of the amorphous moiety. The ultrahigh-molecular-weight polyethylene powder of the present embodiment having the degree of crystallinity of 85% or less is easy to process by molding, i.e., tends to be excellent in molding processability.

In the present embodiment, the method for controlling the degree of crystallinity of the ultrahigh-molecular-weight polyethylene powder to the range mentioned above is not particularly limited. For example, a hexane solvent containing 0.05 to 0.5 g of a low-molecular-weight polyethylene component (molecular weight: 1,000 to 3,000) per 1 L of the hexane solvent is used in polymerization. This low-molecular-weight polyethylene component probably works like a crystal nucleator to promote crystallization. In the present embodiment, the degree of crystallinity can be determined by, for example, but not particularly limited to, a method described in Examples mentioned later.

[Apparent Density of Ultrahigh-Molecular-Weight Polyethylene Powder]

The apparent density of the ultrahigh-molecular-weight polyethylene powder of the present embodiment is 0.45 g/cm$^3$ or smaller, preferably 0.43 g/cm$^3$ or smaller, more preferably 0.41 g/cm$^3$ or smaller, most preferably 0.39 g/cm$^3$ or smaller. The ultrahigh-molecular-weight polyethylene powder of the present embodiment having the apparent density of 0.45 g/cm$^3$ or smaller can be smoothly sent without clogging an extruder hopper when sent from the extruder hopper into an extruder, and is excellent in molding processability.

In the present embodiment, the apparent density means the density of a powder obtained by fully filling a container having a given capacity with the powder, and using the inner capacity as a volume. Specifically, the apparent density of the ultrahigh-molecular-weight polyethylene powder means the mass of the ultrahigh-molecular-weight polyethylene powder per unit capacity in the container having a given capacity as described above. As for a specific method for calculating the apparent density according to the present embodiment, the apparent density can be determined by, for example, but not particularly limited to, a method described in Examples mentioned later.

In the present embodiment, the method for controlling the apparent density of the ultrahigh-molecular-weight polyethylene powder to the range mentioned above is not particularly limited, and the apparent density can be adjusted, for example, by controlling the proportion of the void in the ultrahigh-molecular-weight polyethylene powder as described above.

[Titanium (Ti) Content in Ultrahigh-Molecular-Weight Polyethylene Powder]

The content of titanium (Ti) in the ultrahigh-molecular-weight polyethylene powder of the present embodiment is 10 ppm or less, preferably 8 ppm or less, more preferably 6 ppm or less, further preferably 4 ppm or less. In general, large amounts of metals derived from catalyst residues remaining in an ultrahigh-molecular-weight polyethylene powder have a strong tendency to cause an uneven thickness of a molded article. However, the ultrahigh-molecular-weight polyethylene powder of the present embodiment tends to be excellent in quality by adjusting the content of titanium to such a range. This also tends to enhance safety when the ultrahigh-molecular-weight polyethylene powder of the present embodiment is employed in battery uses.

The Ti content in the ultrahigh-molecular-weight polyethylene powder can be controlled by the productivity of an ethylene homopolymer or an ethylene-based polymer per unit catalyst. The productivity of an ethylene homopolymer or an ethylene-based polymer can be controlled by a polymerization temperature, a polymerization pressure, or a slurry concentration in a reactor for production. Specifically, examples of the approach of enhancing the productivity of the ethylene homopolymer or the ethylene-based polymer used in the present embodiment include, but are not particularly limited to, elevation of a polymerization temperature, elevation of a polymerization pressure, and/or elevation of a slurry concentration in polymerization. In other methods, the amount of titanium may be controlled by selecting the type of a promoter component, decreasing the concentration of the promoter component, or washing the ethylene homopolymer or the ethylene-based polymer with an acid or an alkali in polymerization for the ethylene homopolymer or the ethylene-based polymer.

The content of Ti can be measured by, for example, but not particularly limited to, a method described in Examples mentioned later.

[Method for Producing Ultrahigh-Molecular-Weight Polyethylene Powder]

Hereinafter, the method for producing the ultrahigh-molecular-weight polyethylene powder of the present embodiment will be described in detail.

(Catalyst Component)

Examples of the catalytic component for use in the production of the ultrahigh-molecular-weight polyethylene powder according to the present embodiment include, but are not particularly limited to, general Ziegler-Natta catalysts and metallocene catalysts.

<Ziegler-Natta Catalyst>

The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by the following formula 1 which is soluble in an inert hydrocarbon solvent with a titanium compound (A-2) represented by the following formula 2:

$$(A\text{-}1)\text{:}(M^1)_\alpha(Mg)_\beta(R^2)_a(R^3)_b(Y^1)_c \qquad \text{Formula 1}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N═C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and a, 13, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha + 2\beta = a+b+c$ (wherein n represents the valence of $M^1$); and

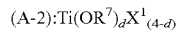    Formula 2 wherein d represents a real number of 0 or larger and 4 or smaller; $R^7$ represents a hydrocarbon group having 1 or more and 20 or less carbon atoms; and $X^1$ represents a halogen atom.

Specific examples of the inert hydrocarbon solvent for use in the reaction between the compounds (A-1) and (A-2) include, but are not particularly limited to: aliphatic hydrocarbons such as pentane, hexane, and heptane; aromatic hydrocarbons such as benzene and toluene; and alicyclic hydrocarbons such as cyclohexane and methylcyclohexane.

First, the compound (A-1) will be described. The compound (A-1) is represented in the form of an organic magnesium complex compound soluble in an inert hydrocarbon solvent, and encompasses all of dihydrocarbyl magnesium compounds and their complexes with other metal compounds. The relational expression $n\alpha + 2\beta = a+b+c$ of the symbols α, β, a, b, and c represents the stoichiometry of metal atom valence and substituents.

In the formula 1, specific examples of the hydrocarbon group having 2 or more and 20 or less carbon atoms, represented by $R^2$ or $R^3$ include, but are not particularly limited to, alkyl groups, cycloalkyl groups, and aryl groups, for example, ethyl, propyl, butyl, pentyl, hexyl, octyl, decyl, cyclohexyl, and phenyl groups. Among them, alkyl groups are preferred. When $\alpha > 0$, a metal atom selected from the group consisting of groups 12, 13, and 14 of the periodic system can be used as the metal atom $M^1$. Examples thereof include, but are not particularly limited to, zinc, boron, and aluminum. Among them, aluminum and zinc are preferred.

The ratio β/α of magnesium to the metal atom $M^1$ is not particularly limited and is preferably 0.1 or more and 30 or less, more preferably 0.5 or more and 10 or less. In the case of using a predetermined organic magnesium compound wherein α=0, although not particularly limited, for example, a compound wherein $R^2$ is 1-methylpropyl is soluble in an inert hydrocarbon solvent. Such a compound also brings about a preferred consequence to the present embodiment. It is recommended that $R^2$ and $R^3$ satisfy any one of the following three conditions (1), (2), and (3) in the formula 1 wherein α=0.

Condition (1): at least one of $R^2$ and $R^3$ is a secondary or tertiary alkyl group having 4 or more and 6 or less carbon atoms, preferably both of $R^2$ and $R^3$ are alkyl groups having 4 or more and 6 or less carbon atoms and at least one of the groups is a secondary or tertiary alkyl group;

Condition (2): $R^2$ and $R^3$ are alkyl groups differing in the number of carbon atoms, preferably $R^2$ is an alkyl group having 2 or 3 carbon atoms and $R^3$ is an alkyl group having 4 or more carbon atoms; and Condition (3): at least one of $R^2$ and $R^3$ is a hydrocarbon group having 6 or more carbon atoms, preferably, an alkyl group wherein the total number of carbon atoms contained in $R^2$ and $R^3$ is 12 or more.

Hereinafter, these groups will be shown specifically. In Condition (1), specific examples of the secondary or tertiary alkyl group having 4 or more and 6 or less carbon atoms include, but are not particularly limited to, 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), specific examples of the alkyl group having 2 or 3 carbon atoms include, but are not particularly limited to, ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

Alternatively, in Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderate long chain alkyl group is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In the formula 1, $Y^1$ is any of alkoxy, siloxy, allyloxy, amino, amide, —N═C—$R^4$, $R^5$, —$SR^6$ (wherein $R^4$, $R^5$, and $R^6$ each independently represent a hydrocarbon group having 2 or more and 20 or less carbon atoms), and a β-keto acid residue.

In the formula 1, the hydrocarbon group represented by $R^4$, $R^5$, or $R^6$ is preferably an alkyl or aryl group having 1 or more and 12 or less carbon atoms, particularly preferably an alkyl or aryl group having 3 or more and 10 or less carbon atoms. Examples include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl and 2-ethylhexyl groups are particularly preferred.

In the formula 1, $Y^1$ is preferably an alkoxy group or a siloxy group. Specific examples of the alkoxy group preferably include, but are not particularly limited to, methoxy, ethoxy, propoxy, 1-methylethoxy, butoxy, 1-methylpropoxy, 1,1-dimethylethoxy, pentoxy, hexoxy, 2-methylpentoxy, 2-ethylbutoxy, 2-ethylpentoxy, 2-ethylhexoxy, 2-ethyl-4-methylpentoxy, 2-propylheptoxy, 2-ethyl-5-methyloctoxy, octoxy, phenoxy, and naphthoxy groups. Among them, butoxy, 1-methylpropoxy, 2-methylpentoxy, and 2-ethylhexoxy groups are more preferred. Specific examples of the siloxy group preferably include, but are not particularly limited to, hydrodimethylsiloxy, ethylhydromethylsiloxy, diethylhydrosiloxy, trimethylsiloxy, ethyldimethylsiloxy, diethylmethylsiloxy, and triethylsiloxy groups. Among them, hydrodimethylsiloxy, ethylhydromethylsiloxy, diethylhydrosiloxy, and trimethylsiloxy groups are more preferred.

In the present embodiment, the compound (A-1) can be synthesized by any method without particular limitations and may be synthesized by reacting, for example, an organic magnesium compound selected from the group consisting of the formulas $R^2MgX^1$ and $R^2Mg$ (wherein $R^2$ is as defined above, and $X^1$ represents halogen) with an organic metal compound selected from the group consisting of the formulas $M^1R^3_n$ and $M^1R^3_{(n-1)}H$ (wherein $M^1$ and $R^3$ are as defined above, and n represents the valence of $M^1$) at 25° C. or higher and 150° C. or lower in an inert hydrocarbon solvent and, if necessary, subsequently with a compound represented by the formula $Y^1$—H (wherein $Y^1$ is as defined above) or with an organic magnesium compound and/or an organic aluminum compound having a functional group represented by $Y^1$. In the approach of reacting the organic magnesium compound soluble in an inert hydrocarbon solvent with a compound represented by the formula $Y^1$—H, the order in which the compounds are added to the reaction system is not particularly limited. Any of the following methods can be used: for example, the compound represented by the formula $Y^1$—H is added into the organic magnesium compound; the organic magnesium compound is added into the compound represented by the formula $Y^1$—H; and both of the compounds are added at the same time.

In the present embodiment, the molar composition ratio $c/(\alpha+\beta)$ of $Y^1$ to all metal atoms in the compound (A-1) is $0 \leq c/(\alpha+\beta) \leq 2$, preferably $0 \leq c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by the formula 2:

Formula 2 wherein d represents a real number of 0 or larger and 4 or smaller; $R^7$ represents a hydrocarbon group having 1 or more and 20 or less carbon atoms; and $X^1$ represents a halogen atom.

In the formula 2, d is preferably 0 or larger and 1 or smaller, further preferably 0. In the formula 2, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Examples of the halogen represented by $X^1$ include chlorine, bromine, and iodine. Among them, chlorine is preferred. In the present embodiment, the compound (A-2) is particularly preferably titanium tetrachloride. In the present embodiment, two or more compounds selected from these compounds may be used as a mixture.

Next, the reaction between the compounds (A-1) and (A-2) will be described. The reaction is preferably carried out in an inert hydrocarbon solvent and further preferably carried out in an aliphatic hydrocarbon solvent such as hexane or heptane. In the reaction, the molar ratio between (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is preferably within the range of −80° C. or higher and 150° C. or lower, further preferably within the range of −40° C. or higher and 100° C. or lower. The order in which the compounds (A-1) and (A-2) are added to the reaction system is not particularly limited. Any of the following methods can be used: the compound (A-2) is added subsequently to the compound (A-1), the compound (A-1) is added subsequently to the compound (A-2); and the compounds (A-1) and (A-2) are added at the same time. The method of adding the compounds (A-1) and (A-2) at the same time is preferred. In the present embodiment, the solid catalytic component [A] obtained by the reaction is used as a slurry solution with an inert hydrocarbon solvent.

Another example of the Ziegler-Natta catalytic component used in the present embodiment is preferably a catalyst for olefin polymerization comprising a solid catalytic component [C] and an organic metal compound component [B], wherein the solid catalytic component [C] is produced by reacting an organic magnesium compound (C-1) represented by the formula 3 which is soluble in an inert hydrocarbon solvent with a chlorinating agent (C-2) represented by the formula 4, and allowing an organic magnesium compound (C-4) represented by the formula 5 which is soluble in an inert hydrocarbon solvent and a titanium compound (C-5) represented by the formula 6 to be supported by a carrier (C-3) thus prepared:

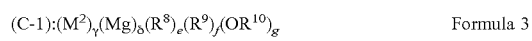

Formula 3 wherein $M^2$ represents a metal atom selected from the group consisting of groups 12, 13, and 14 of the periodic system; $R^8$, $R^9$, and $R^{10}$ each represent a hydrocarbon group having 1 or more and 20 or less carbon atoms; and γ, δ, e, f, and g each represent a real number that satisfies the following relationships: $0 \leq \gamma$, $0 < \delta$, $0 \leq e$, $0 \leq f$, $0 \leq g$, $0 < e+f$, $0 \ g/(\gamma+\delta) \leq 2$, and $k\gamma+2\delta=e+f+g$ (wherein k represents the valence of $M^2$);

Formula 4 wherein $R^{11}$ represents a hydrocarbon group having 1 or more and 12 or less carbon atoms; and h and i each represent a real number that satisfies the following relationships: $0 < h$, $0 < i$, and $0 < h+i \leq 4$;

Formula 5 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha+2\beta=a+b+c$ (wherein n represents the valence of $M^1$); and

Formula 6 wherein d represents a real number of 0 or larger and 4 or smaller; $R^7$ represents a hydrocarbon group having 1 or more and 20 or less carbon atoms; and $X^1$ represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In the formula 3, the relational expression $k\gamma+2\delta=e+f+g$ of the symbols γ, δ, e, f, and g represents the stoichiometry of metal atom valence and substituents.

In the formula 3, specific examples of the hydrocarbon group represented by $R^8$ or $R^9$ include, but are not particularly limited to, alkyl groups, cycloalkyl groups, and aryl groups, for example, methyl, ethyl, propyl, butyl, pentyl, hexyl, octyl, decyl, cyclohexyl, and phenyl groups. Among them, alkyl groups are preferred for each of $R^8$ and $R^9$. When $\gamma>0$, a metal atom selected from the group consisting of groups 12, 13, and 14 of the periodic system can be used as the metal atom $M^2$. Examples thereof include, but are not particularly limited to, zinc, boron, and aluminum. Among them, aluminum and zinc are particularly preferred.

The ratio $\delta/\gamma$ of magnesium to the metal atom $M^2$ is not particularly limited and is preferably 0.1 or more and 30 or less, further preferably 0.5 or more and 10 or less. In the case of using a predetermined organic magnesium compound wherein $\gamma=0$, for example, a compound wherein $R^8$ is 1-methylpropyl is soluble in an inert hydrocarbon solvent. Such a compound also brings about a preferred consequence to the present embodiment. It is recommended that $R^8$ and $R^9$ satisfy any one of the following three conditions (1), (2), and (3) in the formula 3 wherein $7=0$.

Condition (1): at least one of $R^8$ and $R^9$ is a secondary or tertiary alkyl group having 4 or more and 6 or less carbon atoms, preferably, both of $R^8$ and $R^9$ are alkyl groups having 4 or more and 6 or less carbon atoms and at least one of the groups is a secondary or tertiary alkyl group;

Condition (2): $R^8$ and $R^9$ are alkyl groups differing in the number of carbon atoms, preferably, $R^8$ is an alkyl group having 2 or 3 carbon atoms and $R^9$ is an alkyl group having 4 or more carbon atoms; and Condition (3): at least one of $R^8$ and $R^9$ is a hydrocarbon group having 6 or more carbon atoms, preferably, an alkyl group wherein the total number of carbon atoms contained in $R^8$ and $R^9$ is 12 or more.

Hereinafter, these groups will be shown specifically. In Condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Condition (2), examples of the alkyl group having 2 or 3 carbon atoms include, but are not particularly limited to, ethyl, 1-methylethyl, and propyl groups. Among them, an ethyl group is particularly preferred. Specific examples of the alkyl group having 4 or more carbon atoms, but are not particularly limited to, butyl, pentyl, hexyl, heptyl, and octyl groups. Among them, butyl and hexyl groups are particularly preferred.

Alternatively, in Condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderately long-chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group ($OR^{10}$) will be described. The hydrocarbon group represented by $R^{10}$ is preferably an alkyl or aryl group having 1 or more and 12 or less carbon atoms, particularly preferably an alkyl or aryl group having 3 or more and 10 or less carbon atoms. Specific examples of $R^{10}$ include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In the present embodiment, the compound (C-1) can be synthesized by any method without particular limitations and is preferably synthesized by a method of reacting an organic magnesium compound selected from the group consisting of the formulas $R^8MgX^1$ and $R^8Mg$ (wherein $R^8$ is as defined above, and $X^1$ represents a halogen atom) with an organic metal compound selected from the group consisting of the formulas $M^2R^9_k$ and $M^2R^9_{(k-1)}H$ (wherein $M^2$, $R^9$, and k are as defined above) at a temperature of 25° C. or higher and 150° C. or lower in an inert hydrocarbon solvent and, if necessary, subsequently with an alcohol having a hydrocarbon group represented by $R^9$ (wherein $R^9$ is as defined above) or an alkoxy magnesium compound and/or an alkoxy aluminum compound having a hydrocarbon group represented by $R^9$ which is soluble in an inert hydrocarbon solvent.

In the approach of reacting the organic magnesium compound soluble in an inert hydrocarbon solvent with an alcohol, the order in which the compounds are added to the reaction system is not particularly limited. Any of the following methods can be used: the alcohol is added into the organic magnesium compound; the organic magnesium compound is added into the alcohol; and both of the compounds are added at the same time. In the present embodiment, the ratio between the organic magnesium compound soluble in an inert hydrocarbon solvent and the alcohol in the reaction is not particularly limited, and the molar composition ratio $g/(\gamma+\delta)$ of the alkoxy group to all metal atoms in the resulting alkoxy group-containing organic magnesium compound is $0 \leq g/(\gamma+\delta) \leq 2$, preferably $0 \leq g/(\gamma+\delta) < 1$.

Next, the compound (C-2) will be described. The compound (C-2) is a silicon chloride compound having at least one Si—H bond, represented by the formula 4:

$$\text{(C-2)}: H_h SiCl_i R^{11}_{(4-(h+i))} \qquad \text{Formula 4}$$

wherein $R^{11}$ represents s hydrocarbon group having 1 or more and 12 or less carbon atoms; and h and i each represent a real number that satisfies the following relationships: $0<h$, $0<i$, and $0<h+i \leq 4$.

In the formula 4, specific examples of the hydrocarbon group represented by $R^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 or more and 3 or less carbon atoms, such as methyl, ethyl, propyl, and 1-methylethyl group are further preferred. Each of h and i is a number larger than 0 that satisfies the relationship $h+i \leq 4$. Preferably, i is 2 or larger and 3 or smaller.

Specific examples of such a compound include, but are not particularly limited to, $HSiCl_3$, $HSiCl_2CH_3$, $HSiCl_2C_2H_5$, $HSiCl_2(C_3H_7)$, $HSiCl_2(2-C_3H_7)$, $HSiCl_2(C_4H_9)$, $HSiCl_2(C_6H_5)$, $HSiCl_2(4\text{-}Cl-C_6H_4)$, $HSiCl_2(CH=CH_2)$, $HSiCl_2(CH_2C_6H_5)$, $HSiCl_2(1\text{-}C_{10}H_7)$, $HSiCl_2(CH_2CH=CH_2)$, $H_2SiCl(CH_3)$, $H_2SiCl(C_2H_5)$, $HSiCl(CH_3)_2$, $HSiCl(C_2H_5)_2$, $HSiCl(CH_3)(2-C_3H_7)$, $HSiCl(CH_3)(C_6H_5)$, and $HSiCl(C_6H_5)_2$. These silicon chloride compounds are used each alone or as a mixture of two or more types selected from these compounds. Among them, $HSiCl_3$, $HSiCl_2CH_3$, $HSiCl(CH_3)_2$, and $HSiCl_2(C_3H_7)$ are preferred, and $HSiCl_3$ and $HSiCl_2CH_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether vehicle (e.g., diethyl ether or tetrahydrofuran), or a mixed vehicle thereof. Among them, an inert hydrocarbon solvent is more preferred in terms of the performance of the catalyst. The ratio between (C-1) and (C-2) in the reaction is not particularly limited and is preferably 0.01 mol or higher and 100 mol or lower, further preferably 0.1 mol or higher and 10 mol or lower, of silicon atom contained in the compound (C-2) per 1 mol of magnesium atom contained in the compound (C-1).

The method for reacting the compounds (C-1) and (C-2) is not particularly limited. Any of the following methods can be used: the compounds (C-1) and (C-2) are reacted while introduced at the same time to a reactor (simultaneous addition method); a reactor is charged with the compound (C-2) in advance, and then, the compound (C-1) is introduced to the reactor; and a reactor is charged with the compound (C-1) in advance, and then, the compound (C-2) is introduced to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 25° C. or higher and 150° C. or lower, more preferably 30° C. or higher and 120° C. or lower, further preferably 40° C. or higher and 100° C. or lower. In the simultaneous addition method in which the compounds (C-1) and (C-2) are reacted while introduced at the same time to a reactor, the reaction temperature is preferably adjusted to a predetermined temperature by preliminarily setting the temperature of the reactor to a predetermined temperature and adjusting the temperature in the reactor to a predetermined temperature while performing the simultaneous addition. In the method of charging a reactor with the compound (C-2) in advance and then introducing the compound (C-1) to the reactor, the reaction temperature is preferably adjusted to a predetermined temperature by adjusting the temperature of the reactor charged with (C-2) to a predetermined temperature and adjusting the temperature in the reactor to a predetermined temperature while introducing (C-1) to the reactor. In the method of charging a reactor with the compound (C-1) in advance and then introducing the compound (C-2) to the reactor, the reaction temperature is preferably adjusted to a predetermined temperature by adjusting the temperature of the reactor charged with the compound (C-1) to a predetermined temperature and adjusting the temperature in the reactor to a predetermined temperature while introducing the compound (C-2) to the reactor.

Next, the organic magnesium compound (C-4) will be described. The compound (C-4) is preferably represented by the formula 5:

$$(C\text{-}4):(M^1)_\alpha(Mg)_\beta(R^2)_a(R^3)_b Y^1_c \qquad \text{Formula 5}$$

wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, $-N=C-R^4$, $R^5$, $-SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0 < \beta$, $0 \leq a$, $0 \leq b$, $0 < a+b$, $0 \leq c/(\alpha+\beta) \leq 2$, and $n\alpha+2\beta=a+b+c$ (wherein n represents the valence of $M^1$).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or higher and 150° C. or lower, more preferably within the range of −40° C. or higher and 100° C. or lower.

The concentration of the compound (C-4) in use is not particularly limited and is preferably 0.1 mol/L or higher and 2 mol/L or lower, more preferably 0.5 mol/L or higher and 1.5 mol/L or lower, on the basis of titanium atom contained in the compound (C-4). An inert hydrocarbon solvent is preferably used for diluting the compound (C-4).

The order in which the compounds (C-4) and (C-5) are added to the carrier (C-3) is not particularly limited. Any of the following methods can be used: the compound (C-5) is added subsequently to the compound (C-4), the compound (C-4) is added subsequently to the compound (C-5), and the compounds (C-4) and (C-5) are added at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the compound (C-5) will be described. In the present embodiment, the compound (C-5) is a titanium compound represented by the formula 6:

$$(C\text{-}5):Ti(OR^7)_d X^1_{(4-d)} \qquad \text{Formula 6}$$

wherein d represents a real number of 0 or larger and 4 or smaller; $R^7$ represents a hydrocarbon group having 1 or more and 20 or less carbon atoms; and $X^1$ represents a halogen atom.

In the formula 6, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Specific examples of the halogen represented by $X^1$ include, but are not particularly limited to, chlorine, bromine, and iodine. Among them, chlorine is preferred. One compound selected from these compounds may be used alone as the compound (C-5), or two or more compounds selected from these compounds may be used as a mixture.

The amount of the compound (C-5) used is not particularly limited and is preferably 0.01 or more and 20 or less, particularly preferably 0.05 or more and 10 or less, in terms of the molar ratio of titanium atom contained in the compound (C-5) to magnesium atom contained in the carrier (C-3).

The reaction temperature for the compound (C-5) is not particularly limited and is preferably −80° C. or higher and 150° C. or lower, further preferably within the range of −40° C. or higher and 100° C. or lower.

In the present embodiment, the method for allowing the compound (C-5) to be supported by the carrier (C-3) is not particularly limited and may involve reacting an excess of the compound (C-5) with the carrier (C-3) and/or using a third component to efficiently support the compound (C-5). A method of achieving this supporting through the reaction between the compound (C-5) and the organic magnesium compound (C-4) is preferred.

Next, the organic metal compound component [B] for use in the present embodiment will be described. The solid catalytic component for use in the present embodiment can serve as a highly active catalyst for polymerization by combination with the organic metal compound component [B]. The organic metal compound component [B] is also called a "promoter." The organic metal compound component [B] is preferably a compound containing a metal selected from the group consisting of groups 1, 2, 12, and 13 of the periodic system, particularly preferably an organic aluminum compound and/or an organic magnesium compound.

Compounds represented by the formula 7 are preferably used each alone or as a mixture as the organic aluminum compound:

$$AlR^{12}_j Z^1_{(3-j)} \quad \text{Formula 7}$$

wherein $R^{12}$ represents a hydrocarbon group having 1 or more and 20 or less carbon atoms; $Z^1$ represents a group selected from the group consisting of hydrogen, halogen, alkoxy, allyloxy, and siloxy groups; and j represents any number of 2 or larger and 3 or smaller.

In the formula 7, specific examples of the hydrocarbon group having 1 or more and 20 or less carbon atoms, represented by $R^{12}$ include, but are not particularly limited to, aliphatic hydrocarbon groups, aromatic hydrocarbon groups, and alicyclic hydrocarbon groups, for example, trialkyl aluminum compounds such as trimethyl aluminum, triethyl aluminum, tripropyl aluminum, tributyl aluminum, tri(2-methylpropyl) aluminum (or triisobutyl aluminum), tripentyl aluminum, tri(3-methylbutyl) aluminum, trihexyl aluminum, trioctyl aluminum, and tridecyl aluminum; aluminum halide compounds such as diethyl aluminum chloride, ethyl aluminum dichloride, bis(2-methylpropyl) aluminum chloride, ethyl aluminum sesquichloride, and diethyl aluminum bromide; alkoxy aluminum compounds such as diethyl aluminum ethoxide and bis(2-methylpropyl) aluminum butoxide; siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are particularly preferred.

The organic magnesium compound is preferably an organic magnesium compound represented by the formula 3 which is soluble in an inert hydrocarbon solvent:

$$(M^2)_\gamma (Mg)_\delta (R^8)_e (R^9)_f (OR^{10})_g \quad \text{Formula 3}$$

wherein $M^2$ represents a metal atom selected from the group consisting of groups 12, 13, and 14 of the periodic system; $R^8$, $R^9$, and $R^{10}$ each represent a hydrocarbon group having 1 or more and 20 or less carbon atoms; and γ, δ, e, f, and g each represent a real number that satisfies the following relationships: 0≤γ, 0<δ, 0≤e, 0≤f, 0≤g, 0<e+f, 0≤g/(γ+δ) 2, and kγ+2δ=e+f+g (wherein k represents the valence of $M^2$).

This organic magnesium compound is represented in the form of an organic magnesium complex compound soluble in an inert hydrocarbon solvent, but encompasses all of dihydrocarbyl magnesium compounds and their complexes with other metal compounds. Although γ, δ, e, f, g, $M^2$, $R^8$, $R^9$, and $OR^{10}$ are as already defined, this organic magnesium compound is preferably a compound wherein the ratio δ/γ is in the range of 0.5 or more and 10 or less, more preferably a compound wherein $M^2$ is aluminum, because a compound having higher solubility in an inert hydrocarbon solvent is more preferred.

The ratio between the solid catalytic component and the organic metal compound component [B] to be combined is not particularly limited and is preferably 1 mmol or higher and 3,000 mmol or lower of the organic metal compound component [B] per g of the solid catalytic component.

<Metallocene Catalyst>

A general transition metal compound is used in cases using the metallocene catalyst. Examples of the method for producing the metallocene catalyst include, but are not particularly limited to, a production method described in Japanese Patent No. 4868853. Such a metallocene catalyst is constituted by: two catalytic components of (a) a transition metal compound having a cyclic η-binding anionic ligand and (b) an activating agent capable of forming a complex that exerts catalytic activity through reaction with the transition metal compound.

The transition metal compound having a cyclic η-binding anionic ligand used in the present embodiment can be represented by, for example, the following formula 8:

$$L^1_j W_k M^3 X^2_p X^3_q \quad \text{Formula 8}$$

In the formula 8, each $L^1$ independently represents a cyclic η-binding anionic ligand selected from the group consisting of a cyclopentadienyl group, an indenyl group, a tetrahydroindenyl group, a fluorenyl group, a tetrahydrofluorenyl group, and an octahydrofluorenyl group, and this ligand optionally has 1 to 8 substituents, wherein the substituents each independently represent a substituent having up to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups.

In the formula 8, $M^3$ represents a transition metal selected from transition metal groups belonging to group 4 of the periodic system, wherein the formal oxidation number is +2, +3, or +4, and this transition metal is bonded to at least one ligand $L^1$ via $η^5$ bond.

In the formula 8, W represents a divalent substituent having up to 50 non-hydrogen atoms, and this divalent substituent monovalently binds to each of $L^1$ and $M^3$ and thereby forms a metallacycle in collaboration with $L^1$ and $M^3$. Each $X^2$ independently represents an anionic σ-binding type ligand having up to 60 non-hydrogen atoms, selected from the group consisting of a monovalent anionic σ-binding type ligand, a divalent anionic σ-binding type ligand divalently binding to $M^3$, and a divalent anionic σ-binding type ligand monovalently binding to each of $L^1$ and $M^3$.

In the formula 8, each $X^2$ independently represents a neutral Lewis base-coordinating compound having up to 40 non-hydrogen atoms, and $X^3$ represents a neutral Lewis base-coordinating compound.

j is 1 or 2 provided that when j is 2, two ligands $L^1$ are optionally bonded to each other via a divalent group having up to 20 non-hydrogen atoms, wherein the divalent group is a group selected from the group consisting of hydrocarbadiyl groups having 1 to 20 carbon atoms, halohydrocarbadiyl groups having 1 to 12 carbon atoms, hydrocarbyleneoxy groups having 1 to 12 carbon atoms, hydrocarbyleneamino groups having 1 to 12 carbon atoms, a silanediyl group, halosilanediyl groups, and a silyleneamino group.

k is 0 or 1. p is 0, 1, or 2 provided that: when $X^2$ is a monovalent anionic σ-binding type ligand or a divalent anionic σ-binding type ligand binding to $L^1$ and $M^3$, p is an integer smaller by at least 1 than the formal oxidation number of $M^3$; and when $X^2$ is a divalent anionic σ-binding type ligand binding only to $M^3$, p is an integer smaller by at least (j+1) than the formal oxidation number of $M^3$. q is 0, 1, or 2.

Examples of the ligand $X^2$ in the compound of the formula 8 include halides, hydrocarbon groups having 1 to 60 carbon atoms, hydrocarbyloxy groups having 1 to 60 carbon atoms, hydrocarbylamide groups having 1 to 60 carbon atoms, hydrocarbyl phosphide groups having 1 to 60 carbon atoms, hydrocarbyl sulfide groups having 1 to 60 carbon atoms, a silyl group, and combinations thereof.

Examples of the neutral Lewis base-coordinating compound $X^3$ in the compound of the formula 8 include phosphines, ethers, amines, olefins having 2 to 40 carbon atoms, dienes having 3 to 40 carbon atoms, and divalent groups induced from these compounds.

In the present embodiment, the transition metal compound having a cyclic n-binding anionic ligand is preferably a transition metal compound represented by the formula 8 wherein j=1. Preferred examples of the compound represented by the formula 8 wherein j=1 include compounds represented by the following formula 9:

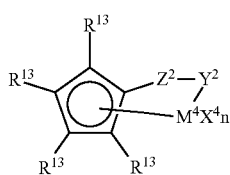

Formula 9

In the formula 9, $M^4$ represents a transition metal selected from the group consisting of titanium, zirconium, nickel, and hafnium, wherein the formal oxidation number of the transition metal is +2, +3, or +4. Each $R^{13}$ independently represents a hydrogen atom or a substituent having up to 20 non-hydrogen atoms, selected from the group consisting of hydrocarbon groups having 1 to 8 carbon atoms, a silyl group, a germyl group, a cyano group, halogen atoms, and combinations thereof provided that when the substituent $R^{13}$ is a hydrocarbon group having 1 to 8 carbon atoms, a silyl group, or a germyl group, two adjacent substituents $R^{13}$ are optionally bonded to each other to form a divalent group, which can form a ring in collaboration with the bond between two carbon atoms of the cyclopentadienyl ring bonded to these two adjacent substituents $R^{13}$, respectively.

In the formula 9, each $X^4$ independently represents a substituent having up to 20 non-hydrogen atoms, selected from the group consisting of halides, hydrocarbon groups having 1 to 20 carbon atoms, hydrocarbyloxy groups having 1 to 18 carbon atoms, hydrocarbylamino groups having 1 to 18 carbon atoms, a silyl group, hydrocarbylamide groups having 1 to 18 carbon atoms, hydrocarbyl phosphide groups having 1 to 18 carbon atoms, hydrocarbyl sulfide groups having 1 to 18 carbon atoms, and combinations thereof provided that two substituents $X^4$ can optionally form in collaboration a neutral conjugate diene having 4 to 30 carbon atoms or a divalent group.

In the formula 9, $Y^2$ represents —O—, —S—, —NR*—, or —PR*— wherein R* represents a hydrogen atom, a hydrocarbon group having 1 to 12 carbon atoms, a hydrocarbyloxy group having 1 to 8 carbon atoms, a silyl group, an alkyl halide group having 1 to 8 carbon atoms, an aryl halide group having 6 to 20 carbon atoms, or a combination thereof.

In the formula 9, $Z^2$ represents $SiR*_2$, $CR*_2$, $SiR*_2SiR*_2$, $CR*_2CR*_2$, $CR*=CR*$, $CR*_2SiR*_2$, or $GeR*_2$ wherein R* is as defined above. n is 1, 2, or 3.

Examples of the transition metal compound having a cyclic n-binding anionic ligand used in the present embodiment include compounds as shown below. Specific examples of the zirconium compounds include, but are not particularly limited to, bis(methylcyclopentadienyl)zirconium dimethyl, bis(n-butylcyclopentadienyl)zirconium dimethyl, bis(indenyl)zirconium dimethyl, bis(1,3-dimethylcyclopentadienyl)zirconium dimethyl, (pentamethylcyclopentadienyl)(cyclopentadienyl)zirconium dimethyl, bis(cyclopentadienyl)zirconium dimethyl, bis(pentamethylcyclopentadienyl)zirconium dimethyl, bis(fluorenyl)zirconium dimethyl, ethylenebis(indenyl)zirconium dimethyl, ethylenebis(4,5,6,7-tetrahydro-1-indenyl)zirconium dimethyl, ethylenebis(4-methyl-1-indenyl)zirconium dimethyl, ethylenebis(5-methyl-1-indenyl)zirconium dimethyl, ethylenebis(6-methyl-1-indenyl)zirconium dimethyl, ethylenebis(7-methyl-1-indenyl)zirconium dimethyl, ethylenebis(5-methoxy-1-indenyl)zirconium dimethyl, ethylenebis(2,3-dimethyl-1-indenyl)zirconium dimethyl, ethylenebis(4,7-dimethyl-1-indenyl)zirconium dimethyl, ethylenebis-(4,7-dimethoxy-1-indenyl)zirconium dimethyl, methylenebis(cyclopentadienyl)zirconium dimethyl, isopropylidene(cyclopentadienyl)zirconium dimethyl, isopropylidene(cyclopentadienyl-fluorenyl)zirconium dimethyl, silylenebis(cyclopentadienyl)zirconium dimethyl, and dimethylsilylene(cyclopentadienyl)zirconium dimethyl.

Specific examples of the titanium compounds include, but are not particularly limited to, [(N-t-butylamido)(tetramethyl-$\eta^5$-cyclopentadienyl)-1,2-ethanediyl]titanium dimethyl, [(N-t-butylamido)(tetramethyl-$\eta^5$-cyclopentadienyl)dimethylsilane]titanium dimethyl, [(N-methylamido)(tetramethyl-$\eta^5$-cyclopentadienyl)dimethylsilane]titanium dimethyl, [(N-phenylamido)(tetramethyl-$\eta^5$-cyclopentadienyl)dimethylsilane]titanium dimethyl, [(N-benzylamido)(tetramethyl-$\eta^5$-cyclopentadienyl)dimethylsilane]titanium dimethyl, [(N-t-butylamido)($\eta^5$-cyclopentadienyl)-1,2-ethanediyl]titanium dimethyl, [(N-t-butylamido)($\eta^5$-cyclopentadienyl)dimethylsilane]titanium dimethyl, [(N-methylamido)($\eta^5$-cyclopentadienyl)-1,2-ethanediyl]titanium dimethyl, [(N-methylamido)($\eta^5$-cyclopentadienyl)dimethylsilane]titanium dimethyl, [(N-t-butylamido)(η$^5$-indenyl) dimethylsilane]titanium dimethyl, and [(N-benzylamido) (η$^5$-indenyl)dimethylsilane]titanium dimethyl.

Specific examples of the nickel compounds include, but are not particularly limited to, dibromobistriphenylphosphine nickel, dichlorobistriphenylphosphine nickel, dibromodiacetonitrile nickel, dibromodibenzonitrile nickel, dibromo(1,2-bisdiphenylphosphinoethane)nickel, dibromo (1,3-bisdiphenylphosphinopropane)nickel, dibromo(1,1'-diphenylbisphosphinoferrocene)nickel, dimethylbisdiphenylphosphine nickel, dimethyl(1,2-bisdiphenylphosphinoethane)nickel, methyl(1,2-bisdiphenylphosphinoethane)nickel tetrafluoroborate, and (2-diphenylphosphino-1-phenylethyleneoxy)phenylpyridine nickel.

Specific examples of the hafnium compounds include, but are not particularly limited to, [(N-t-butylamido)(tetramethyl-η5-cyclopentadienyl)-1,2-ethanediyl]hafnium dimethyl, [(N-t-butylamido)(tetramethyl-η5-cyclopentadienyl) dimethylsilane]hafnium dimethyl, [(N-methylamido) (tetramethyl-η5-cyclopentadienyl)dimethylsilane]hafnium dimethyl, [(N-phenylamido)(tetramethyl-η5-cyclopentadienyl)dimethylsilane]hafnium dimethyl, [(N-benzylamido) (tetramethyl-η5-cyclopentadienyl)dimethylsilane]hafnium dimethyl, [(N-t-butylamido)(η5-cyclopentadienyl)-1,2-ethanediyl]hafnium dimethyl, [(N-t-butylamido)(η5-cyclopentadienyl)dimethylsilane]hafnium dimethyl, [(N-methylamido)(η5-cyclopentadienyl)-1,2-ethanediyl]hafnium dimethyl, [(N-methylamido)(η5-cyclopentadienyl)dimethylsilane]hafnium dimethyl, [(N-t-butylamido)(η5-indenyl) dimethylsilane]hafnium dimethyl, and [(N-benzylamido) (η5-indenyl)dimethylsilane]hafnium dimethyl.

Specific examples of the transition metal compound having a cyclic binding anionic ligand used in the present embodiment further include compounds named by the replacement of the moiety "dimethyl" (which appears at the end of the name of each compound, i.e., immediately after the moiety "zirconium" or "titanium", and corresponds to the moiety of $X^4$ in the formula 9) in the name of each zirconium compound or titanium compound listed above with, for example, any of "dichloro", "dibromo", "diiodo", "diethyl", "dibutyl", "diphenyl", "dibenzyl", "2-(N,N-dimethylamino)benzyl", "2-butene-1,4-diyl", "s-trans-η4-1,4-diphenyl-1,3-butadiene", "s-trans-η$^4$-3-methyl-1,3-pentadiene", "s-trans-η$^4$-1,4-dibenzyl-1,3-butadiene", "s-trans-η$^4$-2,4-hexadiene", "s-trans-η$^4$-1,3-pentadiene", "s-trans-η$^4$-1,4-ditolyl-1,3-butadiene", "s-trans-η$^4$-1,4-bis (trimethylsilyl)-1,3-butadiene", "s-cis-η$^4$-1,4-diphenyl-1,3-butadiene", "s-cis-η$^4$-3-methyl-1,3-pentadiene", "s-cis-η$^4$-1,4-dibenzyl-1,3-butadiene", "s-cis-η$^4$-2,4-hexadiene", "s-cis-η$^4$-1,3-pentadiene", "s-cis-η$^4$-1,4-ditolyl-1,3-butadiene", and "s-cis-η$^4$-1,4-bis(trimethylsilyl)-1,3-butadiene".

The transition metal compound having a cyclic n-binding anionic ligand used in the present embodiment can be synthesized by a method generally known in the art. In the present embodiment, these transition metal compounds may be used singly or in combination.

Next, the activating agent b) capable of forming a complex that exerts catalytic activity through reaction with the transition metal compound (hereinafter, also simply referred to as an "activating agent") used in the present embodiment will be described.

Examples of the activating agent for use in the present embodiment include compounds represented by the following formula 10:

$$[L^2\text{-}H]^{d+}[M^5{}_mQ_p]^{d-}\qquad\text{Formula 10}$$

wherein $[L^2\text{-}H]^{d+}$ represents a proton-donating Bronsted acid wherein $L^2$ represents a neutral Lewis base, and d represents an integer of 1 to 7; and $[M^5{}_mQ_p]^{d-}$ represents a compatible non-coordinating anion wherein $M^5$ represents a metal belonging to any of groups 5 to 15 of the periodic system, or a metalloid, each Q is independently selected from the group consisting of hydrides, halides, dihydrocarbylamide groups having 2 to 20 carbon atoms, hydrocarbyloxy groups having 1 to 30 carbon atoms, hydrocarbon groups having 1 to 30 carbon atoms, and substituted hydrocarbon groups having 1 to 40 carbon atoms wherein the number of the halide represented by Q is 1 or less, m represents an integer of 1 to 7, p represents an integer of 2 to 14, and d is as defined above provided that p−m=d.

Specific examples of the non-coordinating anion include, but are not particularly limited to, tetrakisphenyl borate, tri(p-tolyl)(phenyl) borate, tris(pentafluorophenyl)(phenyl) borate, tris(2,4-dimethylphenyl)(hydroxyphenyl) borate, tris (3,5-dimethylphenyl)(phenyl) borate, tris(3,5-di-trifluoromethylphenyl)(phenyl) borate, tris(pentafluorophenyl)(cyclohexyl) borate, tris(pentafluorophenyl)(naphthyl) borate, tetrakis(pentafluorophenyl) borate, triphenyl(hydroxyphenyl) borate, diphenyl-di(hydroxyphenyl) borate, triphenyl(2, 4-dihydroxyphenyl) borate, tri(p-tolyl)(hydroxyphenyl) borate, tris(pentafluorophenyl)(hydroxyphenyl) borate, tris (2,4-dimethylphenyl)(hydroxyphenyl) borate, tris(3,5-dimethylphenyl)(hydroxyphenyl) borate, tris(3,5-di-trifluoromethylphenyl)(hydroxyphenyl) borate, tris (pentafluorophenyl)(2-hydroxyethyl) borate, tris (pentafluorophenyl)(4-hydroxybutyl) borate, tris (pentafluorophenyl)(4-hydroxy-cyclohexyl) borate, tris (pentafluorophenyl)(4-(4'-hydroxyphenyl)phenyl) borate, and tris(pentafluorophenyl)(6-hydroxy-2-naphthyl) borate.

Other preferred examples of the non-coordinating anion include borates derived from the borates listed above by the replacement of the hydroxy group with a NHR group wherein R is preferably a methyl group, an ethyl group, or a tert-butyl group.

Specific examples of the proton-donating Bronsted acid include, but are not particularly limited to: trialkyl group-substituted ammonium cations such as triethylammonium, tripropylammonium, tri(n-butyl)ammonium, trimethylammonium, tributylammonium, and tri(n-octyl)ammonium; N,N-dialkylanilinium cations such as N,N-dimethylanilinium, N,N-diethylanilinium, N,N-2,4,6-pentamethylanilinium, and N,N-dimethylbenzylanilinium; dialkylammonium cations such as di-(i-propyl)ammonium and dicyclohexylammonium; triarylphosphonium cations such as triphenylphosphonium, tri(methylphenyl)phosphonium, and tri(dimethylphenyl)phosphonium; and dimethylsulfonium, diethylsulfonium, and diphenylsulfonium.

In the present embodiment, an organic metal oxy compound having unit represented by the following formula 11 may be used as the activating agent:

$$\text{—}(M^6R^{14}{}_{n-2}\text{—}P\text{)—}\qquad\text{Formula 11}$$

wherein $M^6$ represents a metal belonging to any of groups 13 to 15 of the periodic system, or a metalloid, each $R^{14}$ independently represents a hydrocarbon group having 1 to 12 carbon atoms or a substituted hydrocarbon group, n represents the valence of the metal $M^6$, and m represents an integer of 2 or larger.

As a preferred example, the activating agent for use in the present embodiment is, for example, an organic aluminum oxy compound comprising a unit represented by the following formula 12:

$$\text{—}(AlR^{15}\text{—}O\text{)—}\qquad\text{Formula 12}$$

wherein $R^{15}$ represents an alkyl group having 1 to 8 carbon atoms, and m represents an integer of 2 to 60.

As a more preferred example, the activating agent for use in the present embodiment is, for example, a methylalumoxane comprising a unit represented by the following formula 13:

  Formula 13 wherein m represents an integer of 2 to 60.

In the present embodiment, these activating agent components may be used singly or in combination.

In the present embodiment, such a catalytic component may be used as a supported catalyst in which the component is supported by a solid component. Such a solid component is not particularly limited and is specifically, for example, at least one inorganic solid material selected from: porous polymer materials such as polyethylene, polypropylene, and styrene-divinylbenzene copolymers; inorganic solid materials having an element belonging to any of groups 2, 3, 4, 13, and 14 of the periodic system, such as silica, alumina, magnesia, magnesium chloride, zirconia, titania, boron oxide, calcium oxide, zinc oxide, barium oxide, vanadium pentaoxide, chromium oxide, and thorium oxide, and mixtures thereof; and complex oxides thereof.

Specific examples of the complex oxides of silica include, but are not particularly limited to, complex oxides of silica and an element of group 2 or 13 of the periodic system, such as silica-magnesia and silica-alumina. In the present embodiment, in addition to the two catalytic components mentioned above, an organic aluminum compound can be used, if necessary, as a catalytic component. The organic aluminum compound that can be used in the present embodiment is, for example, a compound represented by the following formula 14:

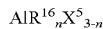  Formula 14 wherein $R^{16}$ represents an alkyl group having 1 to 12 carbon atoms or an aryl group having 6 to 20 carbon atoms, $X^5$ represents halogen, hydrogen, or an alkoxyl group, wherein the alkyl group is linear, branched, or cyclic, and n represents an integer of 1 to 3.

In this context, the organic aluminum compound may be a mixture of compounds represented by the formula 14. In the organic aluminum compound that can be used in the present embodiment, examples of $R^{16}$ in the formula include a methyl group, an ethyl group, a butyl group, an isobutyl group, a hexyl group, an octyl group, a decyl group, a phenyl group, and a tolyl group. Examples of $X^5$ in the formula include a methoxy group, an ethoxy group, a butoxy group, and chloro.

Specific examples of the organic aluminum compound that can be used in the present embodiment include, but are not particularly limited to, trimethyl aluminum, triethyl aluminum, tributyl aluminum, triisobutyl aluminum, trihexyl aluminum, trioctyl aluminum, and tridecyl aluminum. Alternative examples of the organic aluminum compound that can be used in the present embodiment include reaction products of these organic aluminums and alcohols such as methyl alcohol, ethyl alcohol, butyl alcohol, pentyl alcohol, hexyl alcohol, octyl alcohol, and decyl alcohol, for example, dimethyl methoxy aluminum, dimethyl ethoxy aluminum, and dibutyl butoxy aluminum.

(Polymerization Conditions)

In the method for producing the ultrahigh-molecular-weight polyethylene powder of the present embodiment, the polymerization temperature is usually 30° C. or higher and 100° C. or lower. The polymerization temperature equal to or higher than 30° C. tends to realize efficient industrial production. On the other hand, the polymerization temperature equal to or lower than 100° C. tends to realize continuous stable operation. The intrinsic viscosity IV of the ultrahigh-molecular-weight polyethylene powder tends to be lower as the polymerization temperature is higher, and tends to be higher as the polymerization temperature is lower.

In the method for producing the ultrahigh-molecular-weight polyethylene powder of the present embodiment, the polymerization pressure is usually atmospheric pressure or higher and 2 MPa or lower. The polymerization pressure is preferably 0.1 MPa or higher, more preferably 0.12 MPa or higher and preferably 1.5 MPa or lower, more preferably 1.0 MPa or lower. The polymerization pressure equal to or higher than atmospheric pressure tends to realize efficient industrial production. The polymerization pressure equal to or lower than 2 MPa tends to be able to suppress partial heat generation ascribable to rapid polymerization reaction during the introduction of a catalyst, and realize stable production of the polyethylene.

The polymerization reaction can be carried out by any of batch, semicontinuous, and continuous methods. A batch method is preferred from the viewpoint of controlling the proportion of the void in the ultrahigh-molecular-weight polyethylene powder of the present embodiment to the range mentioned above. On the other hand, a continuous method is preferred from the viewpoint of rendering the inside of the polymerization system more uniform. A partial high-temperature state ascribable to rapid ethylene reaction can be suppressed by continuously supplying ethylene gas, a solvent, a catalyst, etc., into the polymerization system while continuously discharging them together with produced polyethylene. Thus, the polymerization system is further stabilized. Ethylene reaction in a homogeneous state in the system prevents the formation of branches and/or double bonds or the like in polymer chains and is less likely to cause reduction in molecular weight and/or cross-linking of the polyethylene. The resulting ultrahigh-molecular-weight polyethylene powder decreases unmelted matter remaining when melted or dissolved, is prevented from being colored, and is less likely to present problems such as reduced mechanical properties.

Alternatively, the polymerization may be carried out at two or more stages differing in reaction conditions. The intrinsic viscosity of the resulting polyethylene can also be adjusted by the presence of hydrogen in the polymerization system or by the change of the polymerization temperature, as described in, for example, the specification of West German Patent Application Publication No. 3127133. The addition of hydrogen as a chain transfer agent into the polymerization system can control the intrinsic viscosity within a proper range. The addition of the chain transfer agent tends to decrease the intrinsic viscosity IV of the ultrahigh-molecular-weight polyethylene to be produced even at the same polymerization temperature. In the case of adding hydrogen into the polymerization system, the mole fraction of the hydrogen is preferably 0 mol % or more and 30 mol % or less, more preferably 0 mol % or more and 25 mol % or less, further preferably 0 mol % or more and 20 mol % or less. In the present embodiment, in addition to each component as mentioned above, other components known in the art to be useful in production of the polyethylene can be included.

As mentioned above, the ultrahigh-molecular-weight polyethylene powder of the present embodiment can be subjected to control method 1 of performing preliminary polymerization, and performing polymerization with the resulting polymer as a preliminary polymerization catalyst under a high-pressure condition, control method 2 of performing polymerization using a deposited catalyst that is a fine powder with a catalytic particle size and has few variations in particle size, followed by drying with high-speed rotation at a high temperature, or control method 3 of collecting only a fine powder polymer by classification, and drying again the powder with high-speed rotation at a high temperature, to control the proportion of the sparse part or the void in the ultrahigh-molecular-weight polyethylene powder to the range mentioned above.

In the case of producing an ultrahigh-molecular-weight polyethylene powder by the control method 1, the preliminary polymerization temperature is preferably 5° C. or higher and 40° C. or lower; the preliminary polymerization pressure is 0.1 MPa or higher and 0.5 MPa or lower; the preliminary polymerization time is 0.5 hours or longer and 3.0 hours or shorter; and the main polymerization pressure is 0.5 MPa or higher and 1.0 MPa or lower.

In the case of producing an ultrahigh-molecular-weight polyethylene powder by the control method 2, the average particle size ($D_{50}$) of the catalyst is preferably 1 μm or larger and 3 μm or smaller; the particle size distribution of the catalytic particle size is preferably 0.5 μm or more and 5 μm or less; the drying temperature is preferably 110° C. or higher and 120° C. or lower; the drying time is preferably 1 hour or longer and 3 hours or shorter; and the rotational speed in drying is preferably 100 rpm or more and 300 rpm or less.

In the case of producing an ultrahigh-molecular-weight polyethylene powder by the control method 3, it is preferred to use a product that passes through a 75 μm sieve (particle size: smaller than 75 μm) in classification operation; the drying temperature is preferably 110° C. or higher and 120° C. or lower; the drying time is preferably 1 hour or longer and 3 hours or shorter; and the rotational speed in drying is preferably 100 rpm or more and 300 rpm or less.

For the polymerization for the ultrahigh-molecular-weight polyethylene powder of the present embodiment, an antistatic agent such as Stadis 450 manufactured by The Associated Octel Company Ltd. (agent: Maruwa Bussan K. K.) may be used for suppressing the adherence of polymers to a polymerization reactor. Stadis 450 may be diluted with an inert hydrocarbon vehicle and then added to the polymerization reactor through a pump or the like. The amount of this dilution added is preferably in the range of 0.10 ppm or higher and 20 ppm or lower, more preferably in the range of 0.20 ppm or higher and 10 ppm or lower, with respect to the amount of the polyethylene produced per unit time.

[Additive]

The ultrahigh-molecular-weight polyethylene powder of the present embodiment can be supplemented, if necessary, with an additive such as a slip agent, a neutralizer, an antioxidant, a light stabilizer, an antistatic agent, or a pigment.

Examples of the slip agent or the neutralizer include, but are not particularly limited to, aliphatic hydrocarbons, higher fatty acids, higher fatty acid metal salts, fatty acid esters of alcohols, waxes, higher fatty acid amides, silicone oil, and rosin. Specific examples thereof include, but are not particularly limited to, calcium stearate. The content of the slip agent or the neutralizer is not particularly limited and is preferably 5000 ppm or lower, more preferably 4000 ppm or lower, further preferably 3000 ppm or lower.

The antioxidant is not particularly limited and is preferably, for example, a phenol compound or a phenol-phosphorus compound, specifically include: phenol antioxidants such as 2,6-di-t-butyl-4-methylphenol(dibutylhydroxytoluene), n-octadecyl-3-(4-hydroxy-3,5-di-t-butylphenyl)propionate, and tetrakis(methylene(3,5-di-t-butyl-4-hydroxyhydrocinnamate))methane, phenol-phosphorus antioxidants such as 6-[3-(3-t-butyl-4-hydroxy-5-methylphenyl) propoxy]-2,4,8,10-tetra-t-butyldibenzo[d,f][1,3,2]dioxaphosphepin, and phosphorus antioxidants such as tetrakis(2,4-di-t-butylphenyl)-4,4'-biphenylene-di-phosphonite, tris(2,4-di-t-butylphenyl)phosphite, and cyclic neopentane tetraylbis (2,4-t-butylphenyl phosphite).

In the ultrahigh-molecular-weight polyethylene powder according to the present embodiment, the amount of the antioxidant is preferably 5 parts by mass or lower, more preferably 4 parts by mass or lower, further preferably 3 parts by mass or lower, particularly preferably 2 parts by mass or lower, per 100 parts by mass in total of the ultrahigh-molecular-weight polyethylene powder and the liquid paraffin. The ultrahigh-molecular-weight polyethylene powder containing 5 parts by mass or lower of the antioxidant is less susceptible to embrittlement and/or discoloration, reduction in mechanical properties, etc., because of the suppressed degradation thereof, resulting in better long-term stability.

Examples of the light stabilizer include, but are not particularly limited to: benzotriazole light stabilizers such as 2-(5-methyl-2-hydroxyphenyl)benzotriazole and 2-(3-t-butyl-5-methyl-2-hydroxyphenyl)-5-chlorobenzotriazole, and hindered amine light stabilizers such as bis(2,2,6,6-tetramethyl-4-piperidine)sebacate and poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]. The content of the light stabilizer is not particularly limited and is 5000 ppm or lower, preferably 3000 ppm or lower, more preferably 2000 ppm or lower.

Examples of the antistatic agent include, but are not particularly limited to, aluminosilicate, kaolin, clay, natural silica, synthetic silica, silicates, talc, diatomaceous earth, and glycerin fatty acid ester.

[Molded Article]

The ultrahigh-molecular-weight polyethylene powder of the present embodiment can be processed by various methods. The molded article of the present embodiment is obtained by molding the ultrahigh-molecular-weight polyethylene powder mentioned above. The molded article of the present embodiment can be employed in various uses. Specific examples of the molded article of the present embodiment include, but are not limited to, separators for secondary batteries (e.g., microporous membranes) and fibers (e.g., high-strength fibers). Among others, the molded article is suitable as a microporous membrane for a lithium ion secondary battery separator or a high-strength fiber.

A conventional method known in the art may be used as a method for producing the molded article of the present embodiment. Examples of such a method include, but are not particularly limited to, compression molding (press molding), extrusion molding, and drawing molding. The method for producing a separator for secondary battery or fiber as the molded article is as follows.

Examples of the method for producing the separator for secondary battery (e.g., microporous membrane) include, but are not particularly limited to, a processing method based on a wet process using a solvent, which involves extrusion in an extruder equipped with a T die, drawing, extraction, and drying. Specific examples thereof include, but are not particularly limited to, a production method under the following general swelling conditions and a production method under low-temperature swelling conditions.
(Swelling Conditions)

The ultrahigh-molecular-weight polyethylene powder, liquid paraffin, and optionally an additive such as an antioxidant are blended and stirred at a temperature lower by 30° C. than the melting point ($T_{m2}$) of the ultrahigh-molecular-weight polyethylene powder to prepare a liquid in a slurry form.

The obtained liquid in a slurry form is charged into a kneader, kneaded at a given temperature, then thermally pressed, and subsequently pressed by cooling to form a gel sheet. The thickness of the gel sheet is adjusted using a metal frame.

This gel sheet is drawn using a simultaneous biaxial drawing machine. Then, the drawn film is cut out and fixed to a metal frame. Then, the resultant is dipped in hexane for the extraction and removal of liquid paraffin, and then dried. The film can be further heat-set to obtain a microporous membrane for a secondary battery separator.

Examples of the method for producing the fiber (e.g., high-strength fiber) include, but are not particularly limited to, a method of kneading and spinning liquid paraffin and the ultrahigh-molecular-weight polyethylene powder mentioned above, followed by heating and drawing to obtain a fiber. Specific examples thereof include, but are not particularly limited to, a production method under the following general swelling conditions and a production method under low-temperature swelling conditions.
(Swelling Conditions)

The ultrahigh-molecular-weight polyethylene powder, liquid paraffin, and optionally an additive such as an antioxidant are blended and stirred at a temperature lower by 30° C. than the melting point ($T_{m2}$) of the ultrahigh-molecular-weight polyethylene powder to prepare a liquid in a slurry form.

Next, the liquid in a slurry form is charged into a kneader, and kneading operation is performed at a given temperature.

Then, spinning is performed through a spinneret attached to Capillograph 1 D.

In this respect, a discharged thread containing liquid paraffin is wound at a location distant from the spinneret.

Subsequently, in order to remove liquid paraffin from the wound thread, the thread is dipped in hexane for extraction operation and then dried.

The obtained thread can be primarily drawn in a thermostat bath and subsequently secondarily drawn in a thermostat bath immediately before being broken to obtain a high-strength fiber (drawn thread).

EXAMPLES

Hereinafter, the present invention will be described more specifically with reference to Examples and Comparative Examples. However, the present invention is not intended to be limited by Examples below by any means.

Herein, ethylene and hexane used in Examples and Comparative Examples were dehydrated using MS-3A (manufactured by UNION SHOWA K. K.). The hexane was used after being further deoxidated by deaeration under reduced pressure using a vacuum pump.
[Methods and Conditions for Measuring]

The physical properties of ultrahigh-molecular-weight polyethylene powders of Examples and Comparative Examples were measured by the following methods.

(Measurement 1) Intrinsic Viscosity IV

The intrinsic viscosity IV of each ultrahigh-molecular-weight polyethylene powder obtained in Examples and Comparative Examples was measured as follows in accordance with ISO1628-3 (2010).

The polyethylene powder was weighed in the range of 4.0 to 4.5 mg and dissolved by stirring at 150° C. for 90 minutes in a dissolution tube, the air inside which was evacuated with a vacuum pump and purged with nitrogen, using 20 mL of decahydronaphthalene (supplemented with 1 g/L 2,6-di-t-butyl-4-methylphenol; hereinafter, referred to as decalin) deaerated with a vacuum pump and purged with nitrogen as a solvent to obtain a solution. The viscosity tube used was a Cannon-Fenske viscometer (manufactured by Sibata Scientific Technology Ltd.: product No. −100).
(Measurement 2) Proportion of Void in Ultrahigh-Molecular-Weight Polyethylene Powder The proportion of a void in each ultrahigh-molecular-weight polyethylene powder obtained in Examples and Comparative Examples was calculated by performing the following steps 1, 2, and 3 in order.
[Step 1; Resin-Embedded Sample Preparation]

100 g of the ultrahigh-molecular-weight polyethylene powder was classified using 10 types of sieves (aperture size: 710 µm, 500 µm, 425 µm, 355 µm, 300 µm, 212 µm, 150 µm, 106 µm, 75 µm, and 53 µm) stipulated by JIS Z 8801, and a particle size that reached 50% by weight in an integral curve in which the weights of particles remaining on respective sieves were integrated from the smaller aperture size was regarded as average particle size ($D_{50}$). A fraction containing a powder having the particle size $D_{50}$ was collected. The collected powder was embedded using high-performance adhesive Araldite Standard (NICHIBAN Co., Ltd.) and dried at 30° C. for 24 hours to prepare a resin-embedded sample. Epoxy resin serving as a base and modified polyamine serving as a curing agent were mixed at a ratio of 1:1.
[Step 2; Optical Microscopic Observation]

The resin-embedded sample was cut into a 10 µm thick section using a microtome manufactured by Nihon Microtome Laboratory, Inc., and the section of the sample thus obtained was placed on a glass slide, to which a small amount (0.05 mL) of liquid paraffine manufactured by MORESCO Corp. (product name: Smoil P-350P) was then added. A glass cover was placed thereon. Next, differential interference contrast observation was performed under optical microscope BX51 manufactured by Olympus Corp. (the light intensity of the microscope was fixed to memory 9). Particles of $D_{50}\pm5$ µm were arbitrarily observed at 10 points, and cross-sectional images of the powder were taken.
[Step 3; Image Analysis]

The cross-sectional images of the powder taken by microscopic observation were binarized (white: polymer moiety, black: void) using image analysis software (A-Zo Kun ver. 2.50 manufactured by Asahi Kasei Corp.). An arbitrary quadrangle circumscribing the polymer moiety (white) was drawn, and the point of intersection between the diagonals of the quadrangle was regarded as a central part of the powder. The proportion of the polymer moiety (white) in the quadrangle was 20% or more. Next, a 20 µm×20 µm square was drawn with the central part of the powder as an axis such that the square was parallel with the quadrangle. The proportion of the void (black) in the square was determined. The same image analysis as above was conducted as to all the 10 points photographed by optical microscopic observation, and an average value thereof was regarded as the proportion of the void (black).

(Measurement 3) Degree of Crystallinity of Ultrahigh-Molecular-Weight Polyethylene Powder The degree of crystallinity of each ultrahigh-molecular-weight polyethylene powder obtained in Examples and Comparative Examples was measured under the following conditions by wide-angle X ray scattering (WAXS).

Ultima-IV manufactured by Rigaku Corp. was used in measurement. Cu-Kα ray was allowed to enter the sample ultrahigh-molecular-weight polyethylene powder, and diffracted light was detected with D/tex Ultra. The measurement conditions were conditions involving a distance of 285 mm between the sample and the detector, an excitation voltage of 40 kV, and a current of 40 mA. A focusing optical system was adopted as an optical system. Slit conditions involved DS=½°, SS=open, and longitudinal slit=10 mm.

(Measurement 4) Apparent Density of Ultrahigh-Molecular-Weight Polyethylene Powder The apparent density of each ultrahigh-molecular-weight polyethylene powder obtained in Examples and Comparative Examples was measured by the following method: the ultrahigh-molecular-weight polyethylene powder was travelled down to a 100 cc cylindrical container until overflowing via a calibrated orifice of a funnel having a standard dimension according to JIS K 6891. Next, in order to prevent consolidation and/or the overflow of the powder from the cup, the blade of a spatula or the like was smoothly moved in a vertical fashion in contact with the upper face of the container to carefully scrape off an excess of powder from the upper face of the container. The powder was wholly removed also from the side of the container, and the mass of the powder together with the container was measured. The mass of the vacant container for measurement measured in advance was subtracted therefrom to calculate the mass of the powder. The above operation was continuously performed three times. Then, the apparent density (g/cm$^3$) was calculated according to the following expression I, and an average value thereof was recorded.

Apparent density (g/cm$^3$)=Mass (g) of the powder/Volume (cm$^3$) of the cylindrical container     expression i (Measurement 5) Ti Content in Ultrahigh-Molecular-Weight Polyethylene Powder Each ultrahigh-molecular-weight polyethylene powder obtained in Examples and Comparative Examples was pressure-decomposed using a microwave decomposition apparatus (model ETHOS TC, manufactured by Milestone General K.K.). The element concentrations of the metal titanium (Ti) contained in the ultrahigh-molecular-weight polyethylene powder were measured by the internal standard method using ICP-MS (inductively coupled plasma-mass spectrometer, model X Series X7, manufactured by Thermo Fisher Scientific K.K.).

(Molded Article Production Process 1) Method for Producing Separator for Secondary Battery (Microporous Membrane) Using High Polymer Concentration A separator for secondary battery was produced as follows using each ultrahigh-molecular-weight polyethylene powder obtained in Examples and Comparative Examples.

40 parts by mass of the ultrahigh-molecular-weight polyethylene powder, 60 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added per 100 parts by mass in total of the ultrahigh-molecular-weight polyethylene powder and the liquid paraffin, and stirred at a temperature lower by 30° C. than the melting point ($T_{m2}$) of the ultrahigh-molecular-weight polyethylene powder for 30 minutes to prepare a liquid in a slurry form.

The obtained liquid in a slurry form was charged into Labo Plastomill (unit model: 4C150-01) manufactured by Toyo Seiki Seisaku-sho, Ltd., kneaded at a screw rotational speed of 50 rpm at a constant temperature of 200° C. for 10 minutes, then thermally pressed under conditions of 180° C./1 MPa/3 minutes, further thermally pressed under conditions of 180° C./10 MPa/2 minutes, and then pressed by cooling under conditions of 25° C./10 MPa/5 minutes to form a gel sheet. The thickness of the gel sheet was adjusted to 1.0 mm using a metal frame having a thickness of 1.0 mm.

This gel sheet was drawn at 115° C. at a ratio of 7×7 using a simultaneous biaxial drawing machine. Then, this drawn film was cut into 30 cm square and fixed to a metal frame having an inside dimension of 25 cm. Then, the resultant was dipped in hexane for the extraction and removal of liquid paraffin, and then dried for 24 hours or longer. The film was further heat-set at 134° C. for 1 minute to obtain a separator for secondary battery.

(Molded Article Production Process 2) Method for Producing Separator for Secondary Battery Using General Polymer Concentration and General Kneading Time A separator for secondary battery was obtained in the same manner as in the above (Molded article production process 1) except that 25 parts by mass of the ultrahigh-molecular-weight polyethylene powder, 75 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added per 100 parts by mass in total of the ultrahigh-molecular-weight polyethylene powder and the liquid paraffin.

(Molded Article Production Process 3) Method for Producing Microporous Membrane for Secondary Battery Separator Using Short Kneading Time A separator for secondary battery was produced as follows using each ultrahigh-molecular-weight polyethylene powder obtained in Examples and Comparative Examples.

25 parts by mass of the ultrahigh-molecular-weight polyethylene powder, 75 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added per 100 parts by mass in total of the ultrahigh-molecular-weight polyethylene powder and the liquid paraffin, and stirred at a temperature lower by 30° C. than the melting point ($T_{m2}$) of the ultrahigh-molecular-weight polyethylene powder for 30 minutes to prepare a liquid in a slurry form.

The obtained liquid in a slurry form was charged into Labo Plastomill (unit model: 4C150-01) manufactured by Toyo Seiki Seisaku-sho, Ltd., kneaded at a screw rotational speed of 50 rpm at a constant temperature of 200° C. for 5 minutes, then thermally pressed under conditions of 180° C./1 MPa/3 minutes, further thermally pressed under conditions of 180° C./10 MPa/2 minutes, and then pressed by cooling under conditions of 25° C./10 MPa/5 minutes to form a gel sheet. The thickness of the gel sheet was adjusted to 1.0 mm using a metal frame having a thickness of 1.0 mm.

This gel sheet was drawn at 115° C. at a ratio of 7×7 using a simultaneous biaxial drawing machine. Then, this drawn film was cut into 30 cm square and fixed to a metal frame having an inside dimension of 25 cm. Then, the resultant was dipped in hexane for the extraction and removal of liquid paraffin, and then dried for 24 hours or longer. The film was further heat-set at 134° C. for 1 minute to obtain a separator for secondary battery.

(Evaluation Method 1) Thickness Variation of Separator for Secondary Battery

Each microporous membrane serving as a separator for secondary battery was produced by the methods described above in (Molded article production process 1) to (Molded article production process 3), and the thickness of the obtained microporous membrane was measured using a film thickness gauge based on JIS K 7130. For measurement locations, one microporous membrane of 25 cm square was cut into 25 microporous membranes of 5 cm square. Their respective central parts were measured, and an average film thickness was calculated. Thickness variations (hereinafter, also referred to as an uneven film thickness), one of the indexes for the quality of the microporous membrane, was evaluated according to the criteria given below on the basis of the average film thickness. The evaluation results are shown in Tables 3 and 4.

(Evaluation Criteria)
A (good): variations of less than ±1.5 μm from the average film thickness.
B (fair): variations of ±1.5 μm or more and less than ±3.0 μm from the average film thickness.
C (poor): variations of ±3.0 μm or more from the average film thickness.

(Evaluation Method 2) Basis Weight-Based Puncture Strength (Gf/(g/m$^2$)) of Separator for Secondary Battery Each microporous membrane serving as a separator for secondary battery described above in (Molded article production process 1) to (Molded article production process 3) was fixed to a sample holder having an opening of 10 mm in diameter using Handy Compression Tester "KES-G5" manufactured by Kato Tech Co., Ltd. Next, a central part of the fixed microporous membrane was subjected to a puncture test under conditions involving a radius of curvature of 0.5 mm at the tip of a needle and a puncture rate of 10 mm/min to obtain a puncture strength (gf) as a maximum puncture load. The obtained puncture strength (gf) was divided by a basis weight to calculate basis weight-based puncture strength (gf/(g/m$^2$)). This operation was carried out 8 times using eight microporous membranes, and an average value from the eight measurements was regarded as basis weight-based puncture strength (gf/(g/m$^2$)) and evaluated according to the evaluation criteria given below. The evaluation results are shown in Tables 3 and 4.

(Evaluation Criteria)
A (good): the basis weight-based puncture strength was 80 gf/(g/m$^2$) or more.
B (fair): the basis weight-based puncture strength was 60 gf/(g/m$^2$) or more and less than 80 gf/(g/m$^2$).
C (poor): the basis weight-based puncture strength was less than 60 gf/(g/m$^2$).

(Molded Article Production Process 4) Method for Producing High-Strength Fiber Using High Polymer Concentration A high-strength fiber was produced as follows using each ultrahigh-molecular-weight polyethylene powder. 15 parts by mass of the ultrahigh-molecular-weight polyethylene powder, 85 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added per 100 parts by mass in total of the ultrahigh-molecular-weight polyethylene powder and the liquid paraffin, and stirred at a temperature lower by 30° C. than the melting point ($T_{m2}$) of the ultrahigh-molecular-weight polyethylene powder for 30 minutes to prepare a liquid in a slurry form.

Next, the liquid in a slurry form was charged into Labo Plastomill (unit model: 4C150-01) manufactured by Toyo Seiki Seisaku-sho, Ltd., and kneaded at a screw rotational speed of 50 rpm at a constant temperature of 200° C. for 10 minutes, followed by spinning operation using Capillograph 1D (unit model: PMD-C) manufactured by Toyo Seiki Seisaku-sho, Ltd. The orifice used had an aperture of 0.5 mm, a length of 5 mm, and an inflow angle of 90°. The spinning conditions involved a temperature of 200° C., an extrusion rate of 20 mm/min, and a winding rate of 50 m/min for winding.

Subsequently, in order to remove liquid paraffin from the wound thread, the thread was dipped in hexane for extraction operation and then dried for 24 hours or longer.

The obtained thread was primarily drawn at a rate of 20 mm/min in a thermostat bath set to 120° C., and subsequently secondarily drawn a rate of 10 mm/min in a thermostat bath set to 140° C., immediately before being broken to obtain a high-strength fiber (drawn thread).

(Molded Article Production Process 5) Method for Producing High-Strength Fiber Using General Polymer Concentration and General Kneading Time A high-strength fiber (drawn thread) was obtained in the same manner as in the above (Molded article production process 5) except that 7 parts by mass of the ultrahigh-molecular-weight polyethylene powder, 93 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added per 100 parts by mass in total of the ultrahigh-molecular-weight polyethylene powder and the liquid paraffin.

(Molded Article Production Process 6) Method for Producing High-Strength Fiber Using Short Kneading Time A high-strength fiber was produced as follows using each ultrahigh-molecular-weight polyethylene powder. 7 parts by mass of the ultrahigh-molecular-weight polyethylene powder, 93 parts by mass of liquid paraffin (liquid paraffin (product name: Smoil P-350P) manufactured by MORESCO Corp.), and 1 part by mass of an antioxidant (tetrakis[methylene(3,5-di-t-butyl-4-hydroxy-hydrocinnamate)]methane (product name: ANOX20) manufactured by Great Lakes Chemical Japan) were added per 100 parts by mass in total of the ultrahigh-molecular-weight polyethylene powder and the liquid paraffin, and stirred at a temperature lower by 30° C. than the melting point ($T_{m2}$) of the ultrahigh-molecular-weight polyethylene powder for 30 minutes to prepare a liquid in a slurry form.

Next, the liquid in a slurry form was charged into Labo Plastomill (unit model: 4C150-01) manufactured by Toyo Seiki Seisaku-sho, Ltd., and kneaded at a screw rotational speed of 50 rpm at a constant temperature of 200° C. for 5 minutes, followed by spinning operation using Capillograph 1D (unit model: PMD-C) manufactured by Toyo Seiki Seisaku-sho, Ltd. The orifice used had an aperture of 0.5 mm, a length of 5 mm, and an inflow angle of 90°. The spinning conditions involved a temperature of 200° C., an extrusion rate of 20 mm/min, and a winding rate of 50 m/min for winding.

Subsequently, in order to remove liquid paraffin from the wound thread, the thread was dipped in hexane for extraction operation and then dried for 24 hours or longer.

The obtained thread was primarily drawn at a rate of 20 mm/min in a thermostat bath set to 120° C., and subsequently secondarily drawn a rate of 10 mm/min in a thermostat bath set to 140° C., immediately before being broken to obtain a high-strength fiber (drawn thread).

(Evaluation Method 3) Uneven Thread Diameter of High-Strength Fiber

A thread diameter was measured at 0.5-m intervals under an optical microscope as to 10 m of each high-strength fiber (drawn thread) obtained by spinning by the methods described above in (Molded article production process 4) to (Molded article production process 6), and an average thread diameter was calculated. An uneven thread diameter, one of the indexes for the quality of the high-strength fiber, was evaluated according to the evaluation criteria given below on the basis of the average thread diameter. The evaluation results are shown in Tables 3 and 4.

(Evaluation Criteria)

A (good): variations of less than ±5 µm from the average thread diameter.

B (fair): variations of ±5 µm or more and less than ±8 µm from the average thread diameter.

C (poor): variations of ±8 µm or more from the average thread diameter.

(Evaluation Method 4) High-Speed Windability Evaluation of High-Strength Fiber

Each gel kneaded by the methods described above in (Molded article production process 4) to (Molded article production process 6) was subjected to spinning operation using Capillograph 1D (unit model: PMD-C) manufactured by Toyo Seiki Seisaku-sho, Ltd. The orifice used had an aperture of 0.5 mm, a length of 5 mm, and an inflow angle of 90°. The spinning conditions involved a temperature of 200° C., an extrusion rate fixed to 20 mm/min, and a winding rate gradually elevated from 3 m/min to 200 m/min at an increase rate of 19.7 m/min². In this respect, a rate at which the thread was broken was measured as a high-speed winding rate, and evaluated according to the evaluation criteria given below on the basis of an average value from five measurements. The evaluation results are shown in Tables 3 and 4.

(Evaluation Criteria)

A (good): the high-speed winding rate was 100 m/min or more.

B (fair): the high-speed winding rate was 50 m/min or more and less than 100 m/min.

C (poor): the high-speed winding rate was less than 50 m/min.

(Measurement 6) Melting Point ($T_{m2}$) of Ultrahigh-Molecular-Weight Polyethylene Powder The melting point ($T_{m2}$) of each ultrahigh-molecular-weight polyethylene powder obtained in Examples and Comparative Examples was measured as follows using DSC8000 manufactured by Perkin Elmer, Inc. as a differential scanning calorimeter (DSC).

8.3 to 8.5 mg of the ultrahigh-molecular-weight polyethylene powder was weighed and placed in an aluminum sample pan. An aluminum cover was attached to this pan, which was then loaded in the differential scanning calorimeter. While the apparatus was purged with nitrogen at a flow rate of 20 mL/min, measurement was carried out under the conditions given below. A pure substance of indium was used in temperature correction.

1) Retaining the powder at 50° C. for 1 minute, followed by heating to 180° C. at a heating rate of 10° C./min.

2) Retaining the powder at 180° C. for 5 minutes, followed by cooling to 50° C. at a cooling rate of 10° C./min.

3) Retaining the powder at 50° C. for 5 minutes, followed by heating to 180° C. at a heating rate of 10° C./min.

The temperature of a peak top in a melting curve obtained in the process of heating in the step 3) was regarded as a melting peak temperature ($T_{m2}$).

(Measurement 7) Proportion of Powder Having Particle of 300 µm or Larger 100 g of each ultrahigh-molecular-weight polyethylene powder was classified using 10 types of sieves (aperture size: 710 µm, 500 µm, 425 µm, 355 µm, 300 µm, 212 µm, 150 µm, 106 µm, 75 µm, and 53 µm) stipulated by JIS Z 8801, and a proportion was calculated from the weight (g) of particles accumulated on the sieves having an aperture size of 300 µm or larger with respect to the weight of all the particles.

Proportion (%) of particles having a particle size of 300 µm or larger=[Weight (g) of particles accumulated on the sieves having an aperture size of 300 µm or larger]/[Weight 100 (g) of all the particles]×100

(Measurement 8) Proportion of Powder Having Particle of Smaller than 53 µm 100 g of each ultrahigh-molecular-weight polyethylene powder was classified using 10 types of sieves (aperture size: 710 µm, 500 µm, 425 µm, 355 µm, 300 µm, 212 µm, 150 µm, 106 µm, 75 µm, and 53 µm) stipulated by JIS Z 8801, and a proportion was calculated from the weight (g) of particles accumulated on the sieves having an aperture size of smaller than 53 µm with respect to the weight of all the particles.

Proportion (%) of particles having a particle size of smaller than 53 µm=[Weight (g) of particles that passed through the sieve having an aperture size of 53 µm]/[Weight 100 (g) of all the particles]×100

Method for Synthesizing Catalyst

Catalyst Production Example 1

Preparation of Supported Metallocene Catalytic Component [A]

(1) Synthesis of Raw Material [a-1]

Spherical silica having an average particle size of 7 µm, a specific surface area of 700 m²/g, and an intra-particle pore volume of 1.9 mL/g was fired at 500° C. for 5 hours in the nitrogen atmosphere for dehydration.

In a 1.8 L autoclave, 40 g of this dehydrated silica was dispersed in 800 mL of hexane in the nitrogen atmosphere to obtain slurry.

While the temperature of the obtained slurry was kept at 20° C. with stirring, 100 mL of a hexane solution of triethyl aluminum (concentration: 1 mol/L) was added dropwise thereto over 1 hour. Then, the mixture was stirred at the same temperature as above for 2 hours.

Then, the obtained reaction mixture was decanted to remove unreacted triethyl aluminum in the supernatant. In this way, 800 mL of hexane slurry of silica component [a-1] treated with triethyl aluminum was obtained.

(2) Preparation of Raw Material [a-2]

[(N-t-Butylamido)(tetramethyl-η5-cyclopentadienyl)dimethylsilane]titanium-1,3-pentadiene (hereinafter, referred to as a "titanium complex") was dissolved at 200 mmol in 1250 mL of Isopar E [trade name of hydrocarbon mixture manufactured by Exxon Chemical Co., Inc. (US)]. To this solution, 25 mL of a hexane solution containing 1 mol/L commercially available butyl ethyl magnesium was added. The titanium complex concentration was adjusted to 0.1 mol/L by the addition of hexane to obtain titanium complex [a-2].

(3) Preparation of Raw Material [a-3]

Bis(hydrogenated tallow alkyl)methylammonium-tris (pentafluorophenyl)(4-hydroxyphenyl) borate (hereinafter, referred to as a "borate") (5.7 g) was added to 50 mL of toluene and dissolved therein to obtain a 100 mmol/L toluene solution of the borate. To this toluene solution of the borate, 5 mL of a hexane solution containing 1 mol/L ethoxydiethyl aluminum was added at room temperature. The borate concentration in the solution was adjusted to 70 mmol/L by the addition of hexane. Then, the mixture was stirred at room temperature for 1 hour to obtain reaction mixture [a-3] containing the borate.

(4) Synthesis of Supported Metallocene Catalyst [A]

While 800 mL of the slurry of the silica component [a-1] obtained in the section (1) was stirred at 20° C., 32 mL of the titanium complex [a-2] obtained in the section (2) and 46 mL of the reaction mixture [a-3] containing the borate obtained in the section (3) were added thereto at the same time over 1 hour. The mixture was further stirred at the same temperature as above for 1 hour such that the titanium complex was reacted with the borate. Catalytic activity can be controlled by adjusting the amounts of the titanium complex [a-2] and the reaction mixture [a-3] containing the borate here. Specifically, the catalytic activity tends to be increased by increasing their amounts. After the completion of the reaction, the supernatant was removed, and unreacted catalytic raw materials were removed with hexane to obtain supported metallocene catalyst [A] containing a catalytic active species formed on the silica (hereinafter, also referred to as solid catalytic component [A] or solid catalyst A).

(5) Synthesis of Raw Material (a-4)

An 8 L stainless autoclave thoroughly purged with nitrogen was charged with 2,000 mL of a hexane solution containing 1 mol/L $Mg_6(C_4H_9)_{12}Al(C_2H_5)_3$ (corresponding to 2000 mmol in total of magnesium and aluminum), and pressure-fed with 240 mL of a hexane solution containing 8.33 mol/L methyl hydrogen polysiloxane (manufactured by Shin-Etsu Chemical Co., Ltd.) with stirring at 80° C., and the stirring was further continued at 80° C. over 2 hours. After the completion of the reaction, the reaction solution was cooled to ordinary temperature and used as raw material (a-4). The raw material (a-4) had a concentration of 0.786 mol/L in total of magnesium and aluminum.

Catalyst Production Example 2

Preparation of Solid Catalytic Component [B]

(1) Synthesis of Raw Material (b-1)

An 8 L stainless autoclave thoroughly purged with nitrogen was charged with 2,000 mL of a hexane solution containing 1 mol/L $Mg_6(C_4H_9)_{12}Al(C_2H_5)_3$ (corresponding to 2000 mmol in total of magnesium and aluminum). To this autoclave, 146 mL of a hexane solution containing 5.47 mol/L n-butanol was added dropwise over 3 hours with stirring at 50° C. After the completion of the dropwise addition, the line was washed with 300 mL of hexane. The reaction was further continued with stirring at 50° C. over 2 hours. After the completion of the reaction, the reaction solution was cooled to ordinary temperature and used as raw material (b-1). The raw material (b-1) had a concentration of 0.704 mol/L in total of magnesium and aluminum.

(2) Synthesis of Raw Material (b-2)

An 8 L stainless autoclave thoroughly purged with nitrogen was charged with 2,000 mL of a hexane solution containing 1 mol/L $Mg_6(C_4H_9)_{12}Al(C_2H_5)_3$ (corresponding to 2000 mmol in total of magnesium and aluminum), and pressure-fed with 240 mL of a hexane solution containing 8.33 mol/L methyl hydrogen polysiloxane (manufactured by Shin-Etsu Chemical Co., Ltd.) with stirring at 80° C., and the reaction was further continued with stirring at 80° C. over 2 hours. After the completion of the reaction, the reaction solution was cooled to ordinary temperature and used as raw material (b-2). The raw material (b-2) had a concentration of 0.786 mol/L in total of magnesium and aluminum.

(3) Synthesis of Carrier (B-1)

An 8 L stainless autoclave thoroughly purged with nitrogen was charged with 1,000 mL of a hexane solution containing 1 mol/L hydroxytrichlorosilane. To this autoclave, 1340 mL of a hexane solution of the organic magnesium compound as the raw material (b-1) (corresponding to 943 mmol of magnesium) was added dropwise at 65° C. over 3 hours, and the reaction was further continued with stirring at 65° C. for 1 hour. After the completion of the reaction, the supernatant was removed, and the resulting solid was washed with 1,800 mL of hexane four times to obtain a carrier (B-1). As a result of analyzing this carrier, the amount of magnesium contained per g of the solid was 7.5 mmol.

(4) Preparation of Solid Catalytic Component [B]

To 1,970 mL of the hexane slurry containing 110 g of the carrier (B-1), 103 mL of a hexane solution containing 1 mol/L titanium tetrachloride and 131 mL of the raw material (b-2) were added at the same time over 3 hours with stirring at 10° C. Catalytic activity can be controlled by adjusting the amounts of the hexane solution of titanium tetrachloride and the raw material (b-2) here. Specifically, the catalytic activity tends to be increased by increasing their amounts. After the addition, the reaction was continued at 10° C. for 1 hour. After the completion of the reaction, the supernatant was removed, and unreacted raw material components were removed by washing with hexane four times to prepare solid catalytic component [B] (hereinafter, also referred to as solid catalyst B).

Catalyst Production Example 3

Preparation of Solid Catalytic Component [C]

(1) Synthesis of Raw Material (c-1)

An 8 L stainless autoclave thoroughly purged with nitrogen was charged with 2,000 mL of a hexane solution containing 1 mol/L $Mg_6(C_4H_9)_{12}Al(C_2H_5)_3$ (corresponding to 2000 mmol in total of magnesium and aluminum), and pressure-fed with 240 mL of a hexane solution containing 8.33 mol/L methyl hydrogen polysiloxane (manufactured by Shin-Etsu Chemical Co., Ltd.) with stirring at 80° C., and the reaction was further continued with stirring at 80° C. over 2 hours. After the completion of the reaction, the reaction solution was cooled to ordinary temperature and used as raw material (c-1). The raw material (c-1) had a concentration of 0.786 mol/L in total of magnesium and aluminum.

(2) Preparation of Solid Catalytic Component [C]

To an 8 L stainless autoclave purged with nitrogen, 1,600 mL of hexane was added. To the autoclave, 800 mL of a hexane solution containing 1 mol/L titanium tetrachloride and 800 mL of the raw material (c-1) were added at the same time over 5 hours with stirring at 10° C. The reaction was continued at 10° C. for 1 hour. After the completion of the reaction, the supernatant was removed, and unreacted raw material components were removed by washing with hexane four times to prepare solid catalytic component [C] (hereinafter, also referred to as solid catalyst C). The catalytic activity of this catalyst can be adjusted by a polymerization pressure in polymerization.

[Promoter]

The promoters used were the following promoters 1 to 3.
Promoter 1: a mixture of commercially available triisobutyl aluminum and diisobutyl aluminum hydride (9:1 (mass ratio in order) mixture)
Promoter 2: $Mg_6(C_4H_9)_{12}AL(C_2H_5)_3$
Promoter 3: The raw material (a-4), the raw material (b-2) or the raw material (c-1) synthesized above Example 1

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 1 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [B] was dispersed in 200 mL of dehydrated normal hexane and introduced into the polymerization reactor, followed by batch preliminary polymerization reaction for 1.0 hour. After the completion of the reaction, the obtained preliminary polymerization catalyst (hereinafter, also referred to as preliminary polymerization catalyst 1) was extracted and collected into a nitrogen glove.

Subsequently, main polymerization was carried out using the collected preliminary polymerization catalyst.

The air inside a vessel-type 1.5 L polymerization reactor equipped with a stirrer was evacuated, and 500 mL of dehydrated normal hexane containing a low-molecular-weight polyethylene component (hereinafter, also referred to as a low-molecular-weight PE component) was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 78° C. Stirring was started at a rotational speed of 1,000 rpm. Subsequently, hydrogen for adjusting intrinsic viscosity IV (molecular weight) was introduced into the polymerization reactor such that its internal pressure was 0.00035 MPa. Further, ethylene was introduced into the polymerization reactor such that its internal pressure was 0.7 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 82.0 g, and catalytic activity (amount of polyethylene obtained per unit catalyst weight) was 15,000 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Example 2

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 78° C. Stirring was started at a rotational speed of 1,000 rpm. Subsequently, hydrogen for adjusting intrinsic viscosity IV (molecular weight) was introduced into the polymerization reactor such that its internal pressure was 0.00035 MPa. Further, ethylene was introduced into the polymerization reactor such that its internal pressure was 0.35 MPa. Then, 5.0 mg of the solid catalytic component [C] collected so as to have only a particle size of 2.0 μm or smaller using a wet classifier (SATAKE i-Classifier manufactured by SATAKE MultiMix Corp.) was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 115° C. for 2.0 hours with stirring at a stirring speed of 300 rpm to obtain an ultrahigh-molecular-weight polyethylene powder. The yield of the ultrahigh-molecular-weight polyethylene powder was 131.6 g, and catalytic activity (amount of polyethylene obtained per unit catalyst weight) was 26,300 (g-PE/g-catalyst). Scales and an extremely coarse powder were removed using a sieve having an aperture size of 425 μm. Then, the physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Example 3

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 78° C. Stirring was started at a rotational speed of 1,000 rpm. Subsequently, hydrogen for adjusting intrinsic viscosity IV (molecular weight) was introduced into the polymerization reactor such that its internal pressure was 0.00035 MPa. Further, ethylene was introduced into the polymerization reactor such that its internal pressure was 0.35 MPa. Then, 5.0 mg of the solid catalytic component [C] was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 128.5 g, and catalytic activity (amount of polyethylene obtained per unit catalyst weight) was 25,680 (g-PE/g-catalyst). Next, scales and a coarse powder were removed using a sieve having an aperture size of 75 μm, and the resultant was stirred at 115° C. for 2.0 hours with stirring at a stirring speed of 300 rpm to obtain a final ultrahigh-molecular-weight polyethylene powder. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Example 4

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 1 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [B] was dispersed in 200 mL of dehydrated normal hexane and introduced into the polymerization reactor, followed by batch preliminary polymerization reaction for 1.0 hour. After the completion of the reaction, the obtained preliminary polymerization catalyst (hereinafter, also referred to as preliminary polymerization catalyst 4) was extracted and collected into a nitrogen glove.

Subsequently, main polymerization was carried out using the collected preliminary polymerization catalyst.

The air inside a vessel-type 1.5 L polymerization reactor equipped with a stirrer was evacuated, and 500 mL of dehydrated normal hexane was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 78° C. Stirring was started at a rotational speed of 1,000 rpm. Subsequently, hydrogen for adjusting intrinsic viscosity IV (molecular weight) was introduced into the polymerization reactor such that its internal pressure was 0.00035 MPa. Further, ethylene and 0.05 mol % of 1-butene (hereinafter, also referred to as a comonomer) were separately introduced through different lines into the polymerization reactor such that its internal pressure was 0.7 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene and the comonomer into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 80.3 g, and catalytic activity (amount of polyethylene obtained per unit catalyst weight) was 14,290 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Example 5

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 1 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [B] was dispersed in 200 mL of dehydrated normal hexane and introduced into the polymerization reactor, followed by batch preliminary polymerization reaction for 1.0 hour. After the completion of the reaction, the obtained preliminary polymerization catalyst (hereinafter, also referred to as preliminary polymerization catalyst 5) was extracted and collected into a nitrogen glove.

Subsequently, main polymerization was carried out using the collected preliminary polymerization catalyst.

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 80° C. Stirring was started at a rotational speed of 1,000 rpm. Subsequently, hydrogen for adjusting intrinsic viscosity IV (molecular weight) was introduced into the polymerization reactor such that its internal pressure was 0.045 MPa. Further, ethylene was introduced into the polymerization reactor such that its internal pressure was 0.8 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 94.5 g, and catalytic activity (amount of polyethylene obtained per unit catalyst weight) was 16,730 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

Microporous membranes for secondary battery separators were produced by the methods described above in (Molded article production process 1) to (Molded article production process 3) using the obtained ultrahigh-molecular-weight polyethylene powder, and evaluated by the evaluation methods 1 and 2. The obtained results of evaluating the microporous membranes are shown in Tables 3 and 4.

Example 6

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 1 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [B] was dispersed in 200 mL of dehydrated normal hexane and introduced into the polymerization reactor, followed by batch preliminary polymerization reaction for 1.0 hour. After the completion of the reaction, the obtained preliminary polymerization catalyst (hereinafter, also referred to as preliminary polymerization catalyst 6) was extracted and collected into a nitrogen glove.

Subsequently, main polymerization was carried out using the collected preliminary polymerization catalyst.

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 80° C. Stirring was started at a rotational speed of 1,000 rpm. Subsequently, hydrogen for adjusting intrinsic viscosity IV (molecular weight) was introduced into the polymerization reactor such that its internal pressure was 0.016 MPa. Further, ethylene was introduced into the polymerization reactor such that its internal pressure was 0.8 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 92.5 g, and catalytic activity (amount of polyethylene obtained per unit catalyst weight) was 16,230 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

Microporous membranes for secondary battery separators were produced by the methods described above in (Molded article production process 1) to (Molded article production process 3) using the obtained ultrahigh-molecular-weight polyethylene powder, and evaluated by the evaluation methods 1 and 2. The obtained results of evaluating the microporous membranes are shown in Tables 3 and 4.

Example 7

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 1 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [B] was dispersed in 200 mL of dehydrated normal hexane and introduced into the polymerization reactor, followed by batch preliminary polymerization reaction for 1.0 hour. After the completion of the reaction, the obtained preliminary polymerization catalyst (hereinafter, also referred to as preliminary polymerization catalyst 7) was extracted and collected into a nitrogen glove.

Subsequently, main polymerization was carried out using the collected preliminary polymerization catalyst.

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 80° C. Stirring was started at a rotational speed of 1,000 rpm. Subsequently, hydrogen for adjusting intrinsic viscosity IV (molecular weight) was introduced into the polymerization reactor such that its internal pressure was 0.0036 MPa. Further, ethylene was introduced into the polymerization reactor such that its internal pressure was 0.8 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 96.5 g, and catalytic activity (amount of polyethylene obtained per unit catalyst weight) was 16,980 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

Microporous membranes for secondary battery separators were produced by the methods described above in (Molded article production process 1) to (Molded article production process 3) using the obtained ultrahigh-molecular-weight polyethylene powder, and evaluated by the evaluation methods 1 and 2. The obtained results of evaluating the microporous membranes are shown in Tables 3 and 4.

Example 8

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 2 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [B] was dispersed in 200 mL of dehydrated normal hexane and introduced into the polymerization reactor, followed by batch preliminary polymerization reaction for 1.0 hour. After the completion of the reaction, the obtained preliminary polymerization catalyst (hereinafter, also referred to as preliminary polymerization catalyst 8) was extracted and collected into a nitrogen glove.

Subsequently, main polymerization was carried out using the collected preliminary polymerization catalyst.

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 2 was dispersed in 100 mL of dehydrated normal hexane and introduced into the polymerization reactor, and the temperature of the polymerization reactor was adjusted to 70° C. Stirring was started at a rotational speed of 1,000 rpm. Subsequently, ethylene gas was introduced into the polymerization reactor such that its internal pressure was 0.7 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 79.5 g, and catalytic activity (amount of polyethylene obtained per unit catalyst weight) was 11,000 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Example 9

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 2 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [B] was dispersed in 200 mL of dehydrated normal hexane and introduced into the polymerization reactor, followed by batch preliminary polymerization reaction for 1.0 hour. After the completion of the reaction, the obtained preliminary polymerization catalyst (hereinafter, also referred to as preliminary polymerization catalyst 9) was extracted and collected into a nitrogen glove.

Subsequently, main polymerization was carried out using the collected preliminary polymerization catalyst.

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 2 was dispersed in 100 mL of dehydrated normal hexane and introduced into the polymerization reactor, and the temperature of the polymerization reactor was adjusted to 58° C. Stirring was started at a rotational speed of 1,000 rpm. Subsequently, ethylene gas was introduced into the polymerization reactor such that its internal pressure was 0.7 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 72.5 g, and catalytic activity (amount of polyethylene obtained per unit catalyst weight) was 8,980 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Example 10

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 3 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [A] was dispersed in 200 mL of dehydrated normal hexane and introduced into the polymerization reactor, followed by batch preliminary polymerization reaction for 1.0 hour. After the completion of the reaction, the obtained preliminary polymerization catalyst (hereinafter, also referred to as preliminary polymerization catalyst 10) was extracted and collected into a nitrogen glove.

Subsequently, main polymerization was carried out using the collected preliminary polymerization catalyst.

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 3 was dispersed in 100 mL of dehydrated normal hexane and introduced into the polymerization reactor, and the temperature of the polymerization reactor was adjusted to 70° C. Stirring was started at a rotational speed of 1,000 rpm. Subsequently, ethylene gas was introduced into the polymerization reactor such that its internal pressure was 0.8 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 70.3 g, and catalytic activity (amount of polyethylene obtained per unit catalyst weight) was 8,520 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Comparative Example 1

The air inside a vessel-type 1.5 L polymerization reactor equipped with a stirrer was evacuated, and 500 mL of dehydrated normal hexane was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 78° C. Stirring was started at a rotational speed of 1,000 rpm. Subsequently, hydrogen for adjusting intrinsic viscosity IV (molecular weight) was introduced into the polymerization reactor such that its internal pressure was 0.00035 MPa. Further, ethylene was introduced into the polymerization reactor such that its internal pressure was 0.35 MPa. Then, 5.0 mg of the solid catalytic component [C] was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 125.5 g, and catalytic activity (amount of polyethylene obtained per unit catalyst weight) was 21,280 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Comparative Example 2

The air inside a vessel-type 1.5 L polymerization reactor equipped with a stirrer was evacuated, and 500 mL of dehydrated normal hexane was then introduced into the polymerization reactor. Subsequently, 0.6 mL of the promoter 2 was dispersed in 100 mL of dehydrated normal hexane and introduced into the polymerization reactor, and the temperature of the polymerization reactor was adjusted to 58° C. Stirring was started at a rotational speed of 1,000 rpm. Subsequently, ethylene gas was introduced into the polymerization reactor such that its internal pressure was 0.35 MPa. Then, 5.0 mg of the solid catalytic component [B] was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 52.5 g, and catalytic activity (amount of polyethylene obtained per unit catalyst weight) was 4,230 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

Comparative Example 3

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 1 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [B] was dispersed in 200 mL of dehydrated normal hexane and introduced into the polymerization reactor, followed by batch preliminary polymerization reaction for 1.0 hour. After the completion of the reaction, the obtained preliminary polymerization catalyst was extracted and collected into a nitrogen glove.

Subsequently, main polymerization was carried out using the collected preliminary polymerization catalyst (hereinafter, also referred to as preliminary polymerization catalyst H-3).

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 1 was dispersed in 100 mL of dehydrated normal hexane and introduced into the polymerization reactor, and the temperature of the polymerization reactor was adjusted to 80° C. Stirring was started at a rotational speed of 1,000 rpm. Subsequently, hydrogen for adjusting intrinsic viscosity IV (molecular weight) was introduced into the polymerization reactor such that its internal pressure was 0.24 MPa. Further, ethylene was introduced into the polymerization reactor such that its internal pressure was 0.8 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 93.5 g, and catalytic activity (amount of polyethylene obtained per unit catalyst weight) was 16,500 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

Microporous membranes for secondary battery separators were produced by the methods described above in (Molded article production process 1) to (Molded article production process 3) using the obtained ultrahigh-molecular-weight polyethylene powder, and evaluated by the evaluation methods 1 and 2. The obtained results of evaluating the microporous membranes are shown in Tables 3 and 4.

Comparative Example 4

The air inside a vessel-type 1.5 L polymerization reactor equipped with a stirrer was evacuated, and 500 mL of dehydrated normal hexane was then introduced into the polymerization reactor. Subsequently, 5.0 mL of the promoter 3 was dispersed in 100 mL of dehydrated normal hexane and introduced into the polymerization reactor, and the temperature of the polymerization reactor was adjusted to 25° C. Stirring was started at a rotational speed of 1,000 rpm. Then, ethylene was adjusted to 30 NL in a flowmeter, and 750.0 mg of the solid catalytic component [A] was dispersed in 200 mL of dehydrated normal hexane and introduced into the polymerization reactor, followed by batch preliminary polymerization reaction for 1.0 hour. After the completion of the reaction, the obtained preliminary polymerization catalyst was extracted and collected into a nitrogen glove.

Subsequently, main polymerization was carried out using the collected preliminary polymerization catalyst (hereinafter, also referred to as preliminary polymerization catalyst H-4).

The air inside a vessel-type 1.5 L polymerization reactor equipped with a stirrer was evacuated, and 500 mL of dehydrated normal hexane containing a low-molecular-weight polyethylene component was then introduced into the polymerization reactor. Subsequently, 0.6 mL of the promoter 3 was dispersed in 100 mL of dehydrated normal hexane and introduced into the polymerization reactor, and the temperature of the polymerization reactor was adjusted to 60° C. Stirring was started at a rotational speed of 1,000 rpm. Subsequently, ethylene gas was introduced into the polymerization reactor such that its internal pressure was 0.8 MPa. Then, 40.0 mg of the preliminary polymerization catalyst was dispersed in 200 mL of dehydrated normal hexane and introduced into the polymerization reactor, followed by batch polymerization reaction for 1.0 hour. During the polymerization reaction, the internal pressure of the polymerization reactor was appropriately maintained by additionally introducing ethylene into the polymerization reactor. Then, the polymerization reactor was opened, and the contents were filtered under reduced pressure to separate and recover a solid component in a powder state. The obtained solid component was placed in a stainless beaker with an aperture of 68 mm and dried at 100° C. for 2.5 hours with stirring at a stirring speed of 50 rpm to obtain an ultrahigh-molecular-weight polyethylene powder. The yield of the ultrahigh-molecular-weight polyethylene powder was 66.3 g, and catalytic activity (amount of polyethylene obtained per unit catalyst weight) was 7,780 (g-PE/g-catalyst). Scales and an extremely coarse powder were removed using a sieve having an aperture size of 425 μm. The physical property evaluation of the ultrahigh-molecular-weight polyethylene powder was carried out. The results of evaluating the ultrahigh-molecular-weight polyethylene powder are shown in Tables 1 and 2.

High-strength fibers were produced by the methods described above in (Molded article production process 4) to (Molded article production process 6) using the obtained ultrahigh-molecular-weight polyethylene powder, and evaluated by the evaluation methods 3 and 4. The obtained results of evaluating the high-strength fibers are shown in Tables 3 and 4.

TABLE 1

| | Conditions | Unit | Example 1 | Example 2 | Example 3 | Example 4 |
|---|---|---|---|---|---|---|
| | Polymerization method | — | Batch method | Batch method | Batch method | Batch method |
| Preliminary polymerization | Preliminary polymerization temperature | ° C. | 25 | — | — | 25 |
| | Amount of monomer charged | NL | 30 | — | — | 30 |
| | Preliminary polymerization time | h | 1 | — | — | 1 |
| | Preliminary polymerization catalyst | — | Solid catalyst B | — | — | Solid catalyst B |
| | Promoter | — | Promoter 1 | — | — | Promoter 1 |
| Polymerization | Polymerization temperature | ° C. | 78 | 78 | 78 | 78 |
| | Polymerization pressure | MPa | 0.7 | 0.35 | 0.35 | 0.7 |
| | Hydrogen concentration | mol % | 0.1 | 0.1 | 0.1 | 0.1 |
| | Hydrogen pressure | MPa | 0.00035 | 0.00035 | 0.00035 | 0.00035 |
| | Amount of monomer charged | MPa | 0.7 | 0.35 | 0.35 | 0.7 |
| | Amount of comonomer | mol % | 0 | 0 | 0 | 0.05 |
| | Low-molecular-weight PE component | g/L | 0.1 | 0.15 | 0.15 | 0.1 |
| | Polymerization catalyst | — | Preliminary polymerization catalyst 1 | Solid catalyst C | Solid catalyst C | Preliminary polymerization catalyst 4 |
| | Promoter | — | Promoter 1 | Promoter 1 | Promoter 1 | Promoter 1 |
| | Polymerization retention time | h | 1 | 1 | 1 | 1 |
| | Amount of catalyst | mg | 40 | 5 | 5 | 40 |
| | Catalytic activity | g-PE/g-catalyst | 15000 | 26300 | 25680 | 14290 |
| Drying | Drying temperature | ° C. | 100 | 115 | 100 | 100 |
| | Drying time | h | 2.5 | 2 | 2.5 | 2.5 |
| | Rotational speed of stirring | rpm | 50 | 300 | 50 | 50 |
| Classification and additional drying | Classification operation | μm | — | — | Less than 75 | — |
| | Drying temperature | ° C. | — | — | 115 | — |
| | Drying time | h | — | — | 2 | — |
| | Rotational speed of stirring | rpm | — | — | 300 | — |

TABLE 1-continued

|  | Conditions | Unit | Example 5 | Example 6 | Example 7 |
|---|---|---|---|---|---|
|  | Polymerization method | — | Batch method | Batch method | Batch method |
| Preliminary polymerization | Preliminary polymerization temperature | °C. | 25 | 25 | 25 |
|  | Amount of monomer charged | NL | 30 | 30 | 30 |
|  | Preliminary polymerization time | h | 1 | 1 | 1 |
|  | Preliminary polymerization catalyst | — | Solid catalyst B | Solid catalyst B | Solid catalyst B |
|  | Promoter | — | Promoter 1 | Promoter 1 | Promoter 1 |
| Polymerization | Polymerization temperature | °C. | 80 | 80 | 80 |
|  | Polymerization pressure | MPa | 0.8 | 0.8 | 0.8 |
|  | Hydrogen concentration | mol % | 45 | 16 | 0.9 |
|  | Hydrogen pressure | MPa | 0.045 | 0.016 | 0.0036 |
|  | Amount of monomer charged | MPa | 0.8 | 0.8 | 0.8 |
|  | Amount of comonomer | mol % | 0 | 0 | 0 |
|  | Low-molecular-weight PE component | g/L | 0.2 | 0.2 | 0.2 |
|  | Polymerization catalyst | — | Preliminary polymerization catalyst 5 | Preliminary polymerization catalyst 6 | Preliminary polymerization catalyst 7 |
|  | Promoter | — | Promoter 1 | Promoter 1 | Promoter 1 |
|  | Polymerization retention time | h | 1 | 1 | 1 |
|  | Amount of catalyst | mg | 40 | 40 | 40 |
|  | Catalytic activity | g-PE/g-catalyst | 16730 | 16230 | 16980 |
| Drying | Drying temperature | °C. | 100 | 100 | 100 |
|  | Drying time | h | 2.5 | 2.5 | 2.5 |
|  | Rotational speed of stirring | rpm | 50 | 50 | 50 |
| Classification and additional drying | Classification operation | μm | — | — | — |
|  | Drying temperature | °C. | — | — | — |
|  | Drying time | h | — | — | — |
|  | Rotational speed of stirring | rpm | — | — | — |

TABLE 2

|  | Conditions | Unit | Example 8 | Example 9 | Example 10 | Comparative Example 1 |
|---|---|---|---|---|---|---|
|  | Polymerization method | — | Batch method | Batch method | Batch method | Batch method |
| Preliminary polymerization | Preliminary polymerization temperature | °C. | 25 | 25 | 25 | — |
|  | Amount of monomer charged | NL | 30 | 30 | 30 | — |
|  | Preliminary polymerization time | h | 1 | 1 | 1 | — |
|  | Preliminary polymerization catalyst | — | Solid catalyst B | Solid catalyst B | Solid catalyst A | — |
|  | Promoter | — | Promoter 2 | Promoter 2 | Promoter 3 | — |
| Polymerization | Polymerization temperature | °C. | 70 | 58 | 70 | 78 |
|  | Polymerization pressure | MPa | 0.7 | 0.7 | 0.8 | 0.35 |
|  | Hydrogen concentration | mol % | 0 | 0 | 0 | 0.1 |
|  | Hydrogen pressure | MPa | 0 | 0 | 0 | 0.00035 |
|  | Amount of monomer charged | MPa | 0.7 | 0.7 | 0.8 | 0.35 |
|  | Amount of comonomer | mol % | 0 | 0 | 0 | 0 |
|  | Low-molecular-weight PE component | g/L | 0.1 | 0.1 | 0.2 | 0 |
|  | Polymerization catalyst | — | Preliminary polymerization catalyst 8 | Preliminary polymerization catalyst 9 | Preliminary polymerization catalyst 10 | Solid catalyst C |
|  | Promoter | — | Promoter 2 | Promoter 2 | Promoter 3 | Promoter 1 |
|  | Polymerization retention time | h | 1 | 1 | 1 | 1 |
|  | Amount of catalyst | mg | 40 | 40 | 40 | 5 |
|  | Catalytic activity | g-PE/g-catalyst | 11000 | 8980 | 8520 | 21280 |
| Drying | Drying temperature | °C. | 100 | 100 | 100 | 100 |
|  | Drying time | h | 2.5 | 2.5 | 2.5 | 2.5 |
|  | Rotational speed of stirring | rpm | 50 | 50 | 50 | 50 |
| Classification and additional drying | Classification operation | μm | — | — | — | — |
|  | Drying temperature | °C. | — | — | — | — |
|  | Drying time | h | — | — | — | — |
|  | Rotational speed of stirring | rpm | — | — | — | — |

TABLE 2-continued

|  | Conditions | Unit | Comparative Example 2 | Comparative Example 3 | Comparative Example 4 |
|---|---|---|---|---|---|
| Preliminary polymerization | Polymerization method | — | Batch method | Batch method | Batch method |
|  | Preliminary polymerization temperature | °C. | — | 25 | 25 |
|  | Amount of monomer charged | NL | — | 30 | 30 |
|  | Preliminary polymerization time | h | — | 1 | 1 |
|  | Preliminary polymerization catalyst | — | — | Solid catalyst B | Solid catalyst A |
|  | Promoter | — | — | Promoter 1 | Promoter 3 |
| Polymerization | Polymerization temperature | °C. | 58 | 80 | 60 |
|  | Polymerization pressure | MPa | 0.35 | 0.8 | 0.8 |
|  | Hydrogen concentration | mol % | 0 | 60 | 0 |
|  | Hydrogen pressure | MPa | 0 | 0.24 | 0 |
|  | Amount of monomer charged | MPa | 0.35 | 0.8 | 0.8 |
|  | Amount of comonomer | mol % | 0 | 0 | 0 |
|  | Low-molecular-weight PE component | g/L | 0 | 0.2 | 0.2 |
|  | Polymerization catalyst | — | Solid catalyst B | Preliminary polymerization catalyst H-3 | Preliminary polymerization catalyst H-4 |
|  | Promoter | — | Promoter 2 | Promoter 1 | Promoter 3 |
|  | Polymerization retention time | h | 1 | 1 | 1 |
|  | Amount of catalyst | mg | 5 | 40 | 40 |
|  | Catalytic activity | g-PE/g-catalyst | 4230 | 16500 | 7780 |
| Drying | Drying temperature | °C. | 100 | 100 | 100 |
|  | Drying time | h | 2.5 | 2.5 | 2.5 |
|  | Rotational speed of stirring | rpm | 50 | 50 | 50 |
| Classification and additional drying | Classification operation | μm | — | — | — |
|  | Drying temperature | °C. | — | — | — |
|  | Drying time | h | — | — | — |
|  | Rotational speed of stirring | rpm | — | — | — |

TABLE 3

|  |  | Unit | Polymer concentration | Kneading time | Evaluation item | Example 1 | Example 2 | Example 3 | Example 4 | Example 5 | Example 6 | Example 7 |
|---|---|---|---|---|---|---|---|---|---|---|---|---|
|  | Intrinsic viscosity | dL/g | — | — | — | 15.6 | 15.8 | 15.8 | 15.6 | 1.1 | 2.7 | 8.5 |
|  | Proportion of area occupied by void | % | — | — | — | 35 | 35 | 25 | 30 | 50 | 50 | 45 |
|  | Proportion of powder having particle size of 300 μm or larger | % by mass | — | — | — | 0.5 | 0.5 | 0.3 | 0.4 | 3.5 | 2.5 | 2 |
|  | Proportion of powder having particle size of smaller than 53 μm | % by mass | — | — | — | 12 | 14 | 14 | 11 | 4 | 5 | 6 |
|  | Degree of crystallinity | % | — | — | — | 80 | 79 | 79 | 73 | 80 | 80 | 80 |
|  | Apparent density | g/cm³ | — | — | — | 0.39 | 0.38 | 0.38 | 0.39 | 0.36 | 0.37 | 0.37 |
|  | Titanium content | ppm | — | — | — | 2 | 2 | 1.5 | 3 | 0.7 | 1 | 1 |
| Evaluation results | Fiber |  | High | General | Uneven thread diameter | A | A | A | A | — | — | — |
|  |  |  | High | General | High-speed windability | A | A | A | B | — | — | — |
|  |  |  | General | General | Uneven thread diameter | A | A | A | A | — | — | — |
|  |  |  | General | General | High-speed windability | A | A | A | A | — | — | — |
|  |  |  | General | Short | Uneven thread diameter | A | A | A | A | — | — | — |
|  |  |  | General | Short | High-speed windability | A | A | A | B | — | — | — |
|  | Separator for secondary battery |  | High | General | Uneven film thickness | — | — | — | — | A | A | A |
|  |  |  | High | General | Puncture strength | — | — | — | — | B | A | A |
|  |  |  | General | General | Uneven film thickness | — | — | — | — | A | A | A |
|  |  |  | General | General | Puncture strength | — | — | — | — | A | A | A |
|  |  |  | General | Short | Uneven film thickness | — | — | — | — | A | A | A |

TABLE 3-continued

| | Unit | Polymer concentration | Kneading time | Evaluation item | Example 1 | 2 | 3 | 4 | 5 | 6 | 7 |
|---|---|---|---|---|---|---|---|---|---|---|---|
| | | General | Short | Puncture strength | — | — | — | — | B | A | A |

TABLE 4

| | | Unit | Polymer concentration | Kneading time | Evaluation item | Example 8 | 9 | 10 | Comparative Example 1 | 2 | 3 | 4 |
|---|---|---|---|---|---|---|---|---|---|---|---|---|
| | Intrinsic viscosity | dL/g | — | — | — | 19.6 | 28.5 | 32.5 | 15.6 | 28.5 | 0.7 | 33.5 |
| | Proportion of area occupied by void | % | — | — | — | 30 | 15 | 7 | 0 | 0 | 50 | 5 |
| | Proportion of powder having particle size of 300 μm or larger | % by mass | — | — | — | 1.5 | 1.5 | 1 | 4 | 3 | 4 | 1 |
| | Proportion of powder having particle size of smaller than 53 μm | % by mass | — | — | — | 15 | 17 | 17 | 22 | 25 | 3 | 18 |
| | Degree of crystallinity | % | — | — | — | 78 | 79 | 79 | 73 | 73 | 80 | 79 |
| | Apparent density | g/cm$^3$ | — | — | — | 0.38 | 0.40 | 0.43 | 0.47 | 0.47 | 0.36 | 0.44 |
| | Titanium content | ppm | — | — | — | 5 | 7 | 8 | 12 | 12 | 0.8 | 16 |
| Evaluation results | Fiber | | High | General | Uneven thread diameter | A | A | B | C | C | — | B |
| | | | High | General | High-speed windability | A | B | B | C | C | — | C |
| | | | General | General | Uneven thread diameter | A | A | A | B | C | — | B |
| | | | General | General | High-speed windability | A | A | A | B | C | — | B |
| | | | General | Short | Uneven thread diameter | A | A | B | C | C | — | B |
| | | | General | Short | High-speed windability | A | B | B | C | C | — | C |
| | Separator for secondary battery | | High | General | Uneven film thickness | — | — | — | — | — | Film not formable | — |
| | | | High | General | Puncture strength | — | — | — | — | — | Film not formable | — |
| | | | General | General | Uneven film thickness | — | — | — | — | — | Film not formable | — |
| | | | General | General | Puncture strength | — | — | — | — | — | Film not formable | — |
| | | | General | Short | Uneven film thickness | — | — | — | — | — | Film not formable | — |
| | | | General | Short | Puncture strength | — | — | — | — | — | Film not formable | — |

The ultrahigh-molecular-weight polyethylene powder of the present invention is excellent in molding processability by having a void in a central part of the powder, and can provide a high-quality molded article, for example, a separator for secondary battery and a fiber, and thus has industrial applicability.

What is claimed is:

1. An ultrahigh-molecular-weight polyethylene powder having intrinsic viscosity IV of 1.0 dL/g or more and 33.0 dL/g or less, and
having a void inside the ultrahigh-molecular-weight polyethylene powder, wherein
a proportion of an area occupied by the void in a cross-sectional structure of the powder is 5% or more with respect to cross-sectional area A,
the cross-sectional structure is a structure of a cross section of powder P having a particle size belonging to a range of average particle size $D_{50}\pm5$ μm in the powder, and
the cross-sectional area A is an area of 20 μm×20 μm square centered on a point of intersection between diagonals of a quadrangle which circumscribes the powder P.

2. The ultrahigh-molecular-weight polyethylene powder according to claim 1, wherein
a proportion of an ultrahigh-molecular-weight polyethylene powder having a particle size of 300 μm or larger is 10% by mass or less with respect to the total amount of the ultrahigh-molecular-weight polyethylene powder, and
a proportion of an ultrahigh-molecular-weight polyethylene powder having a particle size of smaller than 53 μm is 20% by mass or less with respect to the total amount of the ultrahigh-molecular-weight polyethylene powder.

3. The ultrahigh-molecular-weight polyethylene powder according to claim 1, wherein
a degree of crystallinity is 70% or more and 85% or less.

4. The ultrahigh-molecular-weight polyethylene powder according to claim 1, wherein
an apparent density is 0.45 g/cm$^3$ or smaller.

5. The ultrahigh-molecular-weight polyethylene powder according to claim 1, wherein
a titanium content is 10 ppm or less.
6. The ultrahigh-molecular-weight polyethylene powder according to claim 1, wherein
a titanium content is 3 ppm or less.
7. A molded article
prepared by molding the ultrahigh-molecular-weight polyethylene powder according to claim 1.
8. The molded article according to claim 7, wherein the molded article is a separator for secondary battery.
9. The molded article according to claim 7, wherein the molded article is a fiber.

* * * * *